US012780984B2

(12) United States Patent
Wakabayashi et al.

(10) Patent No.: US 12,780,984 B2
(45) Date of Patent: Nov. 3, 2026

(54) POLYCARBONATE DIOL COMPOSITION, METHOD FOR PRODUCING POLYCARBONATE DIOL COMPOSITION, AND POLYURETHANE

(71) Applicant: Mitsubishi Chemical Corporation, Tokyo (JP)

(72) Inventors: Kazuki Wakabayashi, Tokyo (JP); Mitsuhiro Ayuta, Tokyo (JP); Daisuke Kozuma, Tokyo (JP); Shuuma Uchida, Tokyo (JP); Takayuki Yamanaka, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 18/887,241

(22) Filed: Sep. 17, 2024

(65) Prior Publication Data

US 2025/0026884 A1 Jan. 23, 2025

Related U.S. Application Data

(63) Continuation of application No. PCT/JP2023/046172, filed on Dec. 22, 2023.

(30) Foreign Application Priority Data

Feb. 7, 2023 (JP) ................................ 2023-016724
Feb. 7, 2023 (JP) ................................ 2023-016725
Aug. 24, 2023 (JP) ................................ 2023-136447
Aug. 24, 2023 (JP) ................................ 2023-136448

(51) Int. Cl.
*C08G 18/44* (2006.01)
*C08G 64/02* (2006.01)
*C08G 64/30* (2006.01)

(52) U.S. Cl.
CPC ......... *C08G 64/0208* (2013.01); *C08G 18/44* (2013.01); *C08G 64/305* (2013.01)

(58) Field of Classification Search
USPC .......................................................... 528/371
See application file for complete search history.

(56) References Cited

U.S. PATENT DOCUMENTS

| | | | |
|---|---|---|---|
| 4,855,377 | A | 8/1989 | Yokota et al. |
| 5,070,173 | A | 12/1991 | Yokota et al. |
| 2013/0109804 | A1 | 5/2013 | Kusaka et al. |
| 2017/0073466 | A1 | 3/2017 | Kusano et al. |
| 2021/0115191 | A1 | 4/2021 | Kusaka et al. |

FOREIGN PATENT DOCUMENTS

| | | | | | |
|---|---|---|---|---|---|
| CN | 106414550 | A | | 2/2017 | |
| CN | 108409955 | A | | 8/2018 | |
| CN | 114318238 | A | | 4/2022 | |
| JP | 45-009553 | | | 4/1970 | |
| JP | 46-004693 | | | 2/1971 | |
| JP | A-S61-151235 | | | 7/1986 | |
| JP | 62-187725 | | | 8/1987 | |
| JP | 64-000118 | | | 1/1989 | |
| JP | 2-049025 | | | 2/1990 | |
| JP | 2-175721 | | | 7/1990 | |
| JP | 2-289616 | | | 11/1990 | |
| JP | 5-051428 | | | 3/1993 | |
| JP | 2000-095855 | | | 4/2000 | |
| JP | 2001-049164 | | | 2/2001 | |
| JP | 2010-047291 | | | 4/2010 | |
| JP | 2012-51428 | A | | 3/2012 | |
| JP | 2012-072350 | | | 4/2012 | |
| JP | 2013-018978 | | | 1/2013 | |
| JP | 2013-512293 | | | 4/2013 | |
| JP | 2014-062202 | | | 4/2014 | |
| JP | 2017-014427 | | | 1/2017 | |
| JP | 10-2016-0141858 | | | 12/2018 | |
| JP | 2021-152139 | | | 9/2021 | |
| JP | 7468810 81 | | | 4/2024 | |
| TW | 201434878 | A | * | 9/2014 | ......... C08G 18/3206 |
| WO | WO97-031882 | | | 9/1997 | |
| WO | WO 2015-199070 | | | 12/2015 | |
| WO | WO-2015199070 | A1 | * | 12/2015 | ............. C08G 18/10 |

OTHER PUBLICATIONS

TW-201434878-A Machine Translation (Year: 2014).*
WO2015199070 A1 Machine Translation (Year: 2015).*
Katsuji Matsunaga (supervisor), "Polyurethane no Kiso to Oyo (Basic and Application of Polyurethane)", pp. 96-106, CMC Publishing Co., Ltd., issued in Nov. 2006 (with partial English translation).
International Search Report issued Mar. 5, 2024, in PCT/JP2023/046172 filed on Dec. 22, 2023.
Written Opinion of the International Search Authority issued Mar. 5, 2024, in PCT/JP2023/046172 filed on Dec. 22, 2023 (with English translation).
Decision to Grant of JP 2023-579611 mailed on Aug. 13, 2024 (with English translation).

(Continued)

*Primary Examiner* — Terressa Boykin
(74) *Attorney, Agent, or Firm* — Oblon, McClelland, Maier & Neustadt, L.L.P.

(57) ABSTRACT

A polycarbonate diol composition contains: a polycarbonate diol containing a structural unit (1) derived from a compound (1) represented by the following general formula (1); $HO—(CH_2)_n—OH$ (1) (n is an integer of 3 to 6) and an aldehyde having 3 or more and 8 or less carbon atoms. A method for producing a polycarbonate diol composition, includes: polycondensing a carbonate compound and a dihydroxy compound composition containing a compound (1) represented by the following general formula (1) and an aldehyde having 3 or more and 8 or less carbon atoms by a transesterification reaction in the presence of a catalyst, to obtain a polycarbonate diol composition containing a polycarbonate diol. A polyurethane is obtained by using this polycarbonate diol composition.

19 Claims, No Drawings

(56) References Cited

OTHER PUBLICATIONS

Combined Chinese Office Action and Search Report issued Feb. 11, 2025 in Chinese Patent Application No. 202360032424.3 (with unedited computer-generated English translation of Office Action only), 13 pages.
JP-Written Opinion 2023-579611 on Aug. 22, 2025 (with English translation).
Chart of 1H-NMR measurement of 1,6-hexanediol (manufactured by BASF Corporation).
Chart 1 enlarged from the chart of Certificate No. 1-1.
Chart 2 enlarged from the chart of Certificate No. 1-1.
Chart of 1H-NMR measurement of polycarbonate diol composition.
Chart 1 enlarged from the chart of Certificate No. 2-1.
Chart 2 enlarged from the chart of Certificate No. 2-3.
Chart of 1H-NMR measurement of 1.6-hexanediol (manufactured by Tokyo Chemical Industry Co., Ltd.).
Chart 1 enlarged from the chart of Certificate No. 3-1.
Chart 2 enlarged from the chart of Certificate No. 3-1.
Chart of 1H-NMR measurement of 1,6-hexanediol (manufactured by Fujifilm Wako Pure Pharmaceutical Co., Ltd.).
Chart 1 enlarged from the chart of Certificate No. 4-1.
Chart 2 enlarged from the chart of Exhibit No. 4-1.
Chart of 1H-NMR measurement of 1,6-hexanediol (manufactured by Kanto Chemical Co., Ltd.).
Chart 1 enlarged from the chart of Certificate No. 5-1.
Chart 2 enlarged from the chart of Certificate No. 5-1.
JP-Written request for correction 2023-579611 on Aug. 22, 2025 (with English translation).
Extended European Search Report issued on Jul. 30, 2025 in the corresponding European patent application EP 23921378.8.
JP Opposition 2023-579611 on Apr. 17, 2025 with English machine translation.
Encyclopedia of Chemistry 1 (reduced-size edition, the 36th edition) p. 411 with a partial translation.
Experimental Result Report on Mar. 24, 2025, with English machine translation.
Decision to Revoke Patent KR 10-2024-7032798 on Oct. 30, 2025 (with machine translation).
Argument to Request for Cancellation KR 10-2024-7032798 on Oct. 1, 2025 (with machine translation).
Request for Correction KR 10-2024-7032798 on Oct. 1, 2025 (with machine translation).
Patentee Evidence 1 - Additional Experimental Report 1(with English translation), Sep. 5, 2025.
Patentee Evidence 2 - Additional Experimental Report 2 (with English translation), Sep. 5, 2025.
Patentee Evidence 3 - Additional Experimental Report 3 (with English translation), Sep. 5, 2025.
Office Action issued on Jul. 8, 2025 in the corresponding Chinese patent application and its English machine translation Notice of Patent Cancellation Grounds KR 10-2024-7032798 on Jul. 17, 2025 in the corresponding Korean patent application and its English machine translation.
Notice of Patent Cancellation Grouds KR 10-2004-7032798 on Jul. 17, 2025 in the corresponding Korean patent application and its English machine translation.
Request for Cancellation KR 10-2024-7032798 on Jul. 3, 2025 in the corresponding Korean patent application and its English machine translation.
Notification of Reasons for Revocation JP 2023-579611 on Jun. 26, 2025 in the corresponding Japanese patent application and its English machine translation.
JP-Written request for correction 2023-579611 on Feb. 17, 2026 (with English translation).
JP-Written opinion 2023-579811 on Feb. 17, 2026 (with English translation), citing documents 3-7 therein.
Exhibit 6: Supplemental Experiment Report 1(with machine translation).
Exhibit 7-1: Certificate of Analysis for a commercial product of 16HD (Lot No. PAG2999) from FUJIFILM Wako Pure Chemical Corporation (with machine translation).
Exhibit 7-2: Test Report for a commercial product of 16HD (Lot No. 412Y2079) from Kanto Chemical Co., Inc. (with machine translation).
Exhibit 7-3: Certificate of Analysis for a commercial product of 16HD from Tokyo Chemical Industry Co., Ltd. (TCI) (with machine translation).
Exhibit 8: Supplemental Experiment Report 2 (with machine translation).
JP-Notification of Reasons for Revocation 2023-579611 on Dec. 19, 2025 (with machine translation), citing documents 1-2 and 4-11, therein.
Evidence A No. 9: Report of Experimental Results by the Petitioner, Oct. 2, 2025 (with machine translation).
Evidence A No. 10: Report of Experimental Results by the Petitioner, Oct. 2, 2025 (with machine translation).
Evidence A No. 12: Ube News Letters, Ube Industries, Ltd., Jan. 21, 2016 (with machine translation).
Nishiguchi et al., 2E12 Synthesis of 1, 6-hexanediol by hydrogenating dimethyl adipate, Nov. 11, 2011, Proceedings of the 41st Oil / Petrochemical Symposium, Proceedings (with machine translation).
Nishiguchi et al., 2E12 Synthesis of 1, 6-hexanediol by hydrogenating dimethyl adipate, Nov. 11, 2011, Proceedings of the 41st Oil / Petrochemical Symposium, Brief Program (with machine translation).
1, 6-hexanediol, Tokyo Chemical Industry Co., Ltd. Website, Jan. 9, 2026, (https://www.lcichemicals.com/JP/ja/p/H0099) (with machine translation).
1, 6-Hexanediol, website of FUJIFILM Wako Pure Chemical Industries, Ltd., Jan. 18, 2024, (https://labchem- wako.fujifilm.com/sds/W01W0108-0043JGHEJP.pdf) (with machine translation).
1, 8-Hexanediol, Kanto Chemical, website, Jan. 9, 2026, (https://cica- web.kanto.co.jp/CicaWeb/servlet/wsj.front.LogonSvit?Reqltem=18036-30) (with machine translation).
JP-Written Opinion 2023-579611 on Dec. 19, 2025 (with machine translation).
"Certificate of Analysis", Sigma-Aldrich Co., Jul. 23, 2025, 1 page.
"Experimental Report", Asahi Kasei Corporation, Mar. 20, 2019, 9 pages.
Written Opinion mailed on Jun. 9, 2026, to Japanese Application No. 2023-579611, 31 pages (with English Translation).

* cited by examiner

POLYCARBONATE DIOL COMPOSITION, METHOD FOR PRODUCING POLYCARBONATE DIOL COMPOSITION, AND POLYURETHANE

CROSS-REFERENCE TO RELATED APPLICATIONS

This application is a continuation of International Application No. PCT/JP2023/046172 filed on Dec. 22, 2023, and claims the benefit of priority to Japanese Application No. 2023-016724 filed on Feb. 7, 2023, Japanese Application No. 2023-016725 filed on Feb. 7, 2023, Japanese Application No. 2023-136447 filed on Aug. 24, 2023, and Japanese Application No. 2023-136448 filed on Aug. 24, 2023. The content of each of these applications is hereby incorporated by reference in its entirety.

TECHNICAL FIELD

The present invention relates to a polycarbonate diol composition and a method for producing a polycarbonate diol composition. The present invention also relates to a polyurethane obtained by using the polycarbonate diol composition.

BACKGROUND ART

A polycarbonate type polyurethane that uses a polycarbonate diol as a raw material for a soft segment part has been proposed as a polyurethane produced on an industrial scale (Non-Patent Literature 1). The polycarbonate type polyurethane is considered the most durable grade in terms of heat resistance and hydrolysis resistance and is widely used in durable films, artificial leather for automobiles, (aqueous) coating materials, and adhesives.

As a raw material for the polycarbonate type polyurethane, in polycarbonate diols currently widely available on the market, 1,6-hexanediol is mainly used as a raw material dihydroxy compound. Further, in order to improve the flexibility, crystallinity, strength, and the like of the polyurethane, an aliphatic polycarbonate diol using linear aliphatic diols each having 3 to 6 carbon atoms such as 1,6-hexanediol, or using a combination of such a linear aliphatic diol with another dihydroxy compound, has been proposed as a raw material for the polyurethane.

For example, Patent Literature 1 discloses a technique of improving the flexibility and elastic recovery of the obtained polyurethane by combining 1,6-hexanediol and 1,5-pentanediol as a raw material dihydroxy compound for a polycarbonate diol.

Patent Literature 2 discloses a technique of improving the oil resistance, heat resistance, and cold resistance of the obtained polyurethane by combining 1,6-hexanediol and 1,4-butanediol as a raw material dihydroxy compound for a polycarbonate diol.

Patent Literature 3 discloses a technique of improving the strength and hardness of the obtained polyurethane by combining 1,6-hexanediol and isosorbide as a raw material dihydroxy compound for a polycarbonate diol.

CITATION LIST

Patent Literature

Patent Literature 1: JPH02-289616A
Patent Literature 2: JPH05-51428A
Patent Literature 3: JP2012-072350A

Non-Patent Literature

Non Patent Literature 1: Katsuji Matsunaga (supervisor), "Polyurethane no Kiso to Oyo (Basic and Application of Polyurethane)", pp. 96-106, CMC Publishing Co., Ltd., issued in November 2006

SUMMARY OF INVENTION

Technical Problem

However, Patent Literatures 1 to 3 make no mention that an aldehyde contained in the linear aliphatic diol having 3 to 6 carbon atoms, such as 1,6-hexanediol, influences physical properties such as mechanical properties and chemical resistance and also influences a variation in the mechanical properties of the polyurethane obtained by using, as a raw material, a polycarbonate diol obtained by using the linear aliphatic diol.

Therefore, fully satisfactory results have not been obtained in the related art in terms of cost and quality in industrially producing and using the polyurethane obtained by using, as a raw material, a polycarbonate diol obtained by using the linear aliphatic diol having 3 to 6 carbon atoms, such as 1,6-hexanediol.

An object of the present invention is to provide a polycarbonate diol composition that contains a polycarbonate diol obtained by using, as a raw material, a linear aliphatic diol having 3 to 6 carbon atoms, such as 1,6-hexanediol, and that provides a polyurethane excellent in mechanical properties and chemical resistance and having a reduced variation in the mechanical properties using the polycarbonate diol composition.

Solution to Problem

The inventors of the present invention have found that the above problems can be solved by incorporating a specific aldehyde into a polycarbonate diol composition, and have completed the present invention.

The present invention has been achieved based on such findings, and the gist thereof is as follows.

[1] A polycarbonate diol composition containing: a polycarbonate diol containing a structural unit (1) derived from a compound (1) represented by the following general formula (1); and an aldehyde having 3 or more and 8 or less carbon atoms.

$$HO-(CH_2)_n-OH \qquad (1)$$

(In the general formula (1), n is an integer of 3 to 6.)

[2] The polycarbonate diol composition according to [1], in which the aldehyde is an aldehyde having an aliphatic hydrocarbon group having 2 or more and 7 or less carbon atoms.

[3] The polycarbonate diol composition according to [2], in which the aldehyde is at least one selected from 6-hydroxyhexanal and adipaldehyde.

[4] The polycarbonate diol composition according to any one of [1] to [3], in which the compound (1) contains a compound (1-1) represented by the following general formula (1-1).

$$HO-(CH_2)_6-OH \qquad (1\text{-}1)$$

[5] The polycarbonate diol composition according to any one of [1] to [4], in which the polycarbonate diol composition contains the aldehyde in an amount of 440 ppm by mass or less with respect to a total mass of the composition.

[6] The polycarbonate diol composition according to any one of [1] to [5], in which the polycarbonate diol composition contains the aldehyde in an amount of 1 ppm by mass or more with respect to the total mass of the composition.

[7] The polycarbonate diol composition according to any one of [1] to [6], in which a content ratio of a formyl terminal group in the polycarbonate diol is 0.01 mol % or more with respect to 100 mol % of total terminal groups in the polycarbonate diol.

[8] The polycarbonate diol composition according to any one of [1] to [7], in which the polycarbonate diol has a number average molecular weight (Mn) of 250 or more and 5,000 or less.

[9] The polycarbonate diol composition according to any one of [1] to [8], in which the polycarbonate diol further contains at least one selected from a structural unit (2) derived from a compound (2) represented by the following general formula (2) and a structural unit (3) derived from a dihydroxy compound (3) having a moiety represented by the following general formula (3) in a part of a structure.

$$HO—R^1—OH \quad (2)$$

(In the general formula (2), $R^1$ represents a divalent alkylene group having 3 to 20 carbon atoms which may have a substituent. However, the compound (2) represented by the general formula (2) does not include the compound (1) represented by the general formula (1))

$$—(CH_2—O)— \quad (3)$$

(However, this excludes a case where the moiety represented by the general formula (3) is a part of $—CH_2—O—H$.)

[10] The polycarbonate diol composition according to any one of [1] to [9], in which the compound (1) contains a compound derived from a biological raw material.

[11] The polycarbonate diol composition according to [10], in which the compound (1) is the compound derived from a biological raw material alone, or a mixture containing the compound derived from a biological raw material and a compound derived from a fossil fuel.

[12] The polycarbonate diol composition according to [10] or [11], in which the compound derived from a biological raw material is a compound derived from a non-edible biomass and/or a non-fossil fuel.

[13] A method for producing a polycarbonate diol composition, including: polycondensing a carbonate compound and a dihydroxy compound composition containing a compound (1) represented by the following general formula (1) and an aldehyde having 3 or more and 8 or less carbon atoms by a transesterification reaction in the presence of a catalyst, to obtain a polycarbonate diol composition containing a polycarbonate diol.

$$HO—(CH_2)_n—OH \quad (1)$$

(In the general formula (1), n is an integer of 3 to 6.)

[14] The method for producing a polycarbonate diol composition according to [13], in which the aldehyde has an aliphatic hydrocarbon group having 2 or more and 7 or less carbon atoms.

[15] The method for producing a polycarbonate diol composition according to [14], in which the aldehyde is at least one selected from 6-hydroxyhexanal and adipaldehyde.

[16] The method for producing a polycarbonate diol composition according to any one of [13] to [15], in which the compound (1) contains a compound (1-1) represented by the following general formula (1-1).

$$HO—(CH_2)_6—OH \quad (1\text{-}1)$$

[17] The method for producing a polycarbonate diol composition according to any one of [13] to [16], in which the polycarbonate diol composition contains the aldehyde in an amount of 440 ppm by mass or less with respect to a total mass of the composition.

[18] The method for producing a polycarbonate diol composition according to any one of [13] to [17], in which the dihydroxy compound composition contains the aldehyde in an amount of 1 ppm by mass or more with respect to a total mass of the composition.

[19] The method for producing a polycarbonate diol composition according to any one of [13] to [18], in which the dihydroxy compound composition contains the aldehyde in an amount of 900 ppm by mass or less with respect to the total mass of the composition.

[20] The method for producing a polycarbonate diol composition according to any one of [13] to [19], in which the polycarbonate diol has a number average molecular weight (Mn) of 250 or more and 5,000 or less.

[21] The method for producing a polycarbonate diol composition according to any one of [13] to [20], in which the dihydroxy compound composition further contains at least one of a compound (2) represented by the following general formula (2) and a dihydroxy compound (3) having a moiety represented by the following general formula (3) in a part of a structure.

$$HO—R^1—OH \quad (2)$$

(In the general formula (2), $R^1$ represents a divalent alkylene group having 3 to 20 carbon atoms which may have a substituent. However, the compound (2) represented by the general formula (2) does not include the compound (1) represented by the general formula (1))

$$—(CH_2—O)— \quad (3)$$

(However, this excludes a case where the moiety represented by the general formula (3) is a part of $—CH_2—O—H$.)

[22] A polyurethane obtained by using the polycarbonate diol composition according to any one of any one of [1] to [12].

[23] The polyurethane according to [22], which is for use in any one selected from the group consisting of an active energy ray-curable polymer composition, an artificial leather, a synthetic leather, a coating material, a coating agent, an elastic fiber, a pressure-sensitive adhesive, and an adhesive.

Advantageous Effects of Invention

According to the present invention, it is possible to provide a polycarbonate diol composition that provides a polyurethane excellent in mechanical properties and chemical resistance, and that can stably provide a polyurethane having a reduced variation in the mechanical properties and having a high quality.

DESCRIPTION OF EMBODIMENTS

Hereinafter, embodiments of the present invention will be described in detail. The present invention is not limited to the following embodiments, and various modifications can be made within the scope of the gist of the present invention.

In the present description, the term "structural unit" refers to a unit derived from a raw material compound used in production of a polycarbonate diol, which is formed by polymerization of the raw material compound. The term "structural unit" refers to a partial structure sandwiched between any linking groups in the obtained polymer. The structural unit also includes a partial structure in which one terminal is a linking group and the other is a polymerization reactive group at a terminal portion of a polymer. The structural unit may be a unit formed directly by a polymerization reaction, or may be a unit obtained by converting a part of the unit into a different structure by treating the obtained polymer.

In the present description, the term "repeating unit" is synonymous with the term "structural unit".

In the present description, a numerical range expressed using "to" means a range that includes numerical values written before and after "to" as an upper limit value and a lower limit value, unless otherwise specified. For example, "A to B" means A or more and B or less.

In the present description, "including A or B" means "including A," "including B," or "including A and B," unless otherwise specified.

In the present description, "mass %" indicates the content ratio of a given component contained in a total amount of 100 mass %.

In the present description, "mass %", "ppm by mass" and "part by mass" have the same meanings as "wt %", "ppm by weight" and "part by weight", respectively.

In the present description, in the case of simply referring to as "ppm", it indicates "ppm by weight".

In the present description, the term "the obtained polyurethane" refers to a polyurethane produced using a polycarbonate diol composition according to the present invention.

[Polycarbonate Diol Composition]

The polycarbonate diol composition according to the present invention is a polycarbonate diol composition containing a polycarbonate diol containing a structural unit (1) derived from a compound (1) represented by the following general formula (1) (hereinafter, may be referred to as the "polycarbonate diol according to the present invention"), and an aldehyde having 3 or more and 8 or less carbon atoms.

$$HO-(CH_2)_n-OH \quad (1)$$

(In the general formula (1), n is an integer of 3 to 6.)

Hereinafter, the "aldehyde having 3 or more and 8 or less carbon atoms" according to the present invention may be referred to as an "aldehyde (A)".

When the polycarbonate diol composition according to the present invention contains the aldehyde (A), the obtained polyurethane is excellent in mechanical properties and chemical resistance, and it is possible to stably produce a polyurethane having a reduced variation in the mechanical properties and having a high quality.

The aldehyde (A) is to be described in detail later.

In the polycarbonate diol composition according to the present invention, when the polycarbonate diol contains the structural unit (1), the obtained polyurethane can have good mechanical properties, chemical resistance, flexibility, low-temperature properties, and the like.

The compound (1) is to be described in detail later.

<Aldehyde (A)>

The aldehyde (A) in the present invention is not particularly limited as long as it is an aldehyde having 3 or more and 8 or less carbon atoms, and known aldehyde compounds and an aldehyde compound obtained by substituting the hydroxy group in the compound (1) with an aldehyde group can be used.

The aldehyde (A) in the present invention preferably has 3 or more and 6 or less carbon atoms, more preferably has 4 or more and 6 or less carbon atoms, and still more preferably has 6 carbon atoms.

As the aldehyde (A) in the present invention, an aldehyde having an aliphatic hydrocarbon group having 2 or more and 7 or less carbon atoms can be used from the viewpoint of the mechanical properties, the chemical resistance and a reduced variation in the mechanical properties of the obtained polyurethane. Specifically, examples of the aliphatic hydrocarbon group include an aliphatic hydrocarbon group having 2 or more and 7 or less carbon atoms, which may have a branched structure, and which has a linear structure or cyclic structure.

The aldehyde group can react with the hydroxy group to convert it into an acetal group. Therefore, the aldehyde (A) in the present invention also includes an acetal compound obtained by substituting the aldehyde group in the aldehyde with an acetal group (hereinafter, may be referred to as an "acetal (A)"). That is, the content of the aldehyde (A) in the present invention means the total content of the aldehyde compound and an acetal modified product thereof, that is, the acetal (A).

Examples of the acetal (A) include: an acetal compound (a) obtained by reacting the aldehyde group in the aldehyde (A) with a hydroxy group to form an acetal group; an acetal compound (b) obtained by reacting two molecules in a monohydroxy compound with one aldehyde group in the aldehyde (A); an acetal compound (c) obtained by reacting one molecule in a dihydroxy compound with one aldehyde group in the aldehyde (A); and a hemiacetal compound (d) obtained by reacting one molecule in a monohydroxy compound with one aldehyde group in the aldehyde (A).

The acetal (A) may be one kind or two or more kinds.

Further, the aldehyde (A) in the present invention includes both an aldehyde (A) that is free in the polycarbonate diol composition according to the present invention and an aldehyde (A) that is bonded to or associated with the polycarbonate diol in the polycarbonate diol composition or that is included as a part of the structure of the polycarbonate diol.

The form of the above "aldehyde (A) that is bonded to or associated with the polycarbonate diol or that is included as a part of the structure of the polycarbonate diol" is not particularly limited, and examples thereof include a form in which a hydroxy group or an amino group contained in the aldehyde (A) reacts to form a carbonate bond or a urethane bond in the polycarbonate diol.

The aldehyde (A) is produced as a by-product in a hydrogenation reaction step when a carboxylic acid having 3 to 6 carbon atoms, which is a precursor of the compound (1), or an ester derivative of the carboxylic acid, is hydrogenated to produce the compound (1).

The kind of the "precursor of the compound (1)" is not particularly limited, and examples thereof include, in the compound (1) represented by the general formula (1), the following: in the case where n=3, malonic acid or a malonic acid ester; in the case where n=4, succinic acid or a succinic acid ester; in the case where n=5, glutaric acid or a glutaric acid ester; and in the case where n=6 (a compound (1-1) to be described later), adipic acid or an adipic acid ester.

In the stage for producing the compound (1), examples of a method of increasing the amount of the aldehyde (A) as a by-product include the following methods.

Reducing the amount of the catalyst used in the hydrogenation reaction.

Shortening the residence time in the hydrogenation reaction.

Excessively lowering the hydrogen pressure in the hydrogenation reaction.

Conversely, in the stage for producing the compound (1), examples of a method of reducing the amount of the aldehyde (A) as a by-product include the following methods.

Increasing the amount of the catalyst used in the hydrogenation reaction.

Increasing the residence time in the hydrogenation reaction.

Excessively increasing the hydrogen pressure in the hydrogenation reaction.

The hydrogenation of the acetal (A) depends on a hydrogenation catalyst different from that of the aldehyde (A). Therefore, the hydrogenation of the compound (1) containing the aldehyde (A) is carried out using a general hydrogenation catalyst. With this hydrogenation catalyst, the acetal (A) is difficult to be hydrogenated, and accordingly, the acetal (A) may remain in the compound (1).

Further, in the production of the compound (1), the compound (1) is generally purified by distillation after the hydrogenation reaction step. The acetal (A) produced as a by-product in the hydrogenation reaction step may decompose into the aldehyde (A) in the distillation step, and the aldehyde (A) may be mixed into the purified compound (1). In addition, the aldehyde (A) may react with a hydroxy group to generate the acetal (A), which may be mixed into the purified compound (1).

In general, in the case where the boiling point of an impurity produced as a by-product in a process for producing a dihydroxy compound is greatly different from the boiling point of the dihydroxy compound, the impurity can be relatively easily separated and removed by distillation and purification. However, in the present invention, since the aldehyde (A) and the acetal (A) have boiling points close to those of the compound (1), it is difficult to separate and remove them from the compound (1), and the aldehyde (A) and the acetal (A) may remain in the compound (1) after the distillation and purification.

The kind of the aldehyde (A) in the present invention is not particularly limited, and examples thereof include a compound having 4 or more and 6 or less carbon atoms and having 1 or more, preferably 6 or less, aldehyde groups in the molecule. Specifically, examples thereof include, in the compound (1) represented by the general formula (1), the following:

in the case where n=3, monoaldehyde compounds such as 3-hydroxypropanal, and dialdehyde compounds such as malondialdehyde;

in the case where n=4, monoaldehyde compounds such as 4-hydroxybutanal, and dialdehyde compounds such as succinaldehyde;

in the case where n=5, monoaldehyde compounds such as 5-hydroxypentanal, and dialdehyde compounds such as glutaraldehyde; and in the case where n=6 (the compound (1-1) to be described later), monoaldehyde compounds such as 6-hydroxyhexanal, and dialdehyde compounds such as adipaldehyde.

The aldehyde (A) may be used alone or in combination of two or more kinds thereof. Among them, the aldehyde (A) is preferably at least one selected from 6-hydroxyhexanal and adipaldehyde.

<Content Ratio of Aldehyde (A)>

The content ratio of the aldehyde (A) in the polycarbonate diol composition according to the present invention refers to the content ratio of the aldehyde (A) in the composition.

In the case where the polycarbonate diol composition contains the acetal (A), the content ratio of the aldehyde (A) in the polycarbonate diol composition according to the present invention refers to the total content ratio of the aldehyde (A) and the acetal (A) in the composition.

The lower limit of the content ratio of the aldehyde (A) in the polycarbonate diol composition is not particularly limited, and is preferably 1 ppm by mass or more, more preferably 5 ppm by mass or more, still more preferably 15 ppm by mass or more, and particularly preferably 50 ppm by mass or more with respect to the total mass of the composition, from the viewpoint of obtaining excellent mechanical properties and chemical resistance and reducing the variation in the mechanical properties of the obtained polyurethane, and from the economic viewpoint of reducing the amount of the aldehyde (A).

On the other hand, the upper limit of the content ratio of the aldehyde (A) is not particularly limited, and is preferably 440 ppm by mass or less with respect to the total mass of the composition, from the viewpoint of maintaining good mechanical properties and chemical resistance of the obtained polyurethane.

When the content ratio of the aldehyde (A) is too large, depending on the production conditions in producing a polyurethane using the polycarbonate diol composition, the aldehyde (A) reacts with the hydroxy group terminal in the polycarbonate diol or reacts with an isocyanate compound used as a raw material for the polyurethane, whereby a crosslinked structure is formed in the polyurethane during polyurethane polymerization, causing a gelation phenomenon and impairing the polymerization stability. In addition, the polycarbonate diol composition turns yellow and has an impaired color tone. The upper limit of the content ratio of the aldehyde (A) is more preferably 400 ppm by mass or less, still more preferably 350 ppm by mass or less, and particularly preferably 300 ppm by mass or less.

The upper limit and the lower limit can be freely combined. For example, the content ratio of the aldehyde (A) contained in the polycarbonate diol composition according to the present invention is preferably 1 ppm by mass or more and 440 ppm by mass or less, more preferably 5 ppm by mass or more and 400 ppm by mass or less, still more preferably 15 ppm by mass or more and 350 ppm by mass or less, and particularly preferably 50 ppm by mass or more and 300 ppm by mass or less with respect to the total mass of the composition.

In the polycarbonate diol composition according to the present invention, the specific method for controlling the content ratio of the aldehyde (A) in the polycarbonate diol within the above numerical range is not particularly limited, and those skilled in the art can appropriately optimize to control a method for producing a polycarbonate diol composition according to the present invention to be described later and specific production conditions to be described later based on well-known techniques.

<Formyl Terminal Group of Polycarbonate Diol>

The polycarbonate diol composition according to the present invention can contain a formyl terminal group (=formyloxy group (—OCHO)) in the polycarbonate diol.

In the case where the compound (1) or the dihydroxy compound composition contains the aldehyde (A), in the polycarbonate diol composition produced using the compound (1) or the dihydroxy compound composition, a formyl terminal group may be formed in the structure of the polycarbonate diol due to the method for producing the composition.

In the case where the polycarbonate diol composition according to the present invention contains the aldehyde (A) in the polycarbonate diol, the obtained polyurethane has a reduced variation in mechanical properties, and has good mechanical properties and chemical resistance, with an excellent balance between the two. The reason for this is unclear, but is presumed to be as follows.

According to the investigations of the inventors of the present invention, in the case where a polyurethane is polymerized using the polycarbonate diol composition containing a polycarbonate diol having a formyl terminal group, the aldehyde (A) undergoes a condensation reaction with the polycarbonate diol or a chain extender to generate an acetal, thereby forming a branched structure in the polyurethane structure. It has also been found that the presence of the branched structure in this polyurethane structure improves the viscosity of the polyurethane or a composition containing the polyurethane. As a result, the uniformity of the polyurethane composition can be efficiently improved by stirring. When the viscosity is moderately improved, the coating stability and the molding stability of the polyurethane or a composition containing the polyurethane are improved, and the dimensional stability of the obtained film-like material, fiber-like material, and other molded articles is improved. From these, it is presumed that the variation in mechanical properties of the obtained polyurethane product is reduced.

In addition, according to the investigations of the inventors of the present invention, in the case where a polyurethane is polymerized using the polycarbonate diol composition containing a polycarbonate diol having a formyl terminal group, as described above, a part of the aldehyde (A) forms a branched structure in the polyurethane structure, whereby the molecular weight distribution of the obtained polyurethane is wider, and the amounts of the high molecular weight component and the crosslinked component in the polyurethane increase. As a result, it is presumed that the obtained polyurethane has improved strength at break, elongation at break, and chemical resistance.

<Content Ratio of Formyl Terminal Group of Polycarbonate Diol>

In the polycarbonate diol composition according to the present invention, the content ratio of the formyl terminal group in the polycarbonate diol is a content ratio of the formyl terminal group with respect to 100 mol % of total terminal groups in the polycarbonate diol.

The lower limit of the content ratio of the formyl terminal group in the polycarbonate diol is not particularly limited, and is preferably 0.01 mol % or more, more preferably 0.02 mol % or more, still more preferably 0.03 mol % or more, and particularly preferably 0.05 mol % or more with respect to 100 mol % of total terminal groups in the composition, from the viewpoint of obtaining excellent mechanical properties and chemical resistance and reducing the variation in the mechanical properties of the obtained polyurethane. On the other hand, the upper limit of the content ratio of the formyl terminal group is not particularly limited, and is preferably 0.38 mol % or less, more preferably 0.35 mol % or less, still more preferably 0.30 mol % or less, and particularly preferably 0.25 mol % or less with respect to 100 mol % of total terminal groups in the composition, from the viewpoint of maintaining good mechanical properties and chemical resistance of the obtained polyurethane well, and preventing yellowing and improving the color tone of the polycarbonate diol.

The upper limit and the lower limit can be freely combined. For example, the content ratio of the formyl terminal group contained in the polycarbonate diol composition according to the present invention is preferably 0.01 mol % or more and 0.38 mol % or less, more preferably 0.02 mol % or more and 0.35 mol % or less, still more preferably 0.03 mol % or more and 0.30 mol % or less, and particularly preferably 0.05 mol % or more and 0.25 mol % or less with respect to 100 mol % of total terminal groups in the composition.

In the polycarbonate diol composition according to the present invention, the specific method for controlling the content ratio of the formyl terminal group in the polycarbonate diol within the above numerical range is not particularly limited, and those skilled in the art can appropriately optimize to control production conditions in a method for producing a polycarbonate diol composition according to the present invention to be described later based on well-known techniques.

A specific method for measuring the content ratio of the formyl terminal group in the polycarbonate diol will be described in detail in the description of Examples.

<Polycarbonate Diol>

The polycarbonate diol in the present invention is a component constituting the polycarbonate diol composition according to the present invention, and is a polycarbonate diol containing a structural unit (1) derived from a compound (1) represented by the following general formula (1).

$$HO—(CH_2)_n—OH \quad (1)$$

(In the general formula (1), n is an integer of 3 to 6.)

The compound (1) is to be described in detail later.

In the polycarbonate diol composition according to the present invention, the lower limit of the content ratio of the polycarbonate diol is not particularly limited, and is preferably 90 mass % or more, more preferably 95 mass % or more, still more preferably 98 mass % or more, and particularly preferably 99 mass % or more with respect to 100%, i.e., the total mass of the composition, from the viewpoint of not impairing the heat resistance and the hydrolysis resistance that are characteristics of a polycarbonate type polyurethane. On the other hand, the upper limit of the content ratio of the polycarbonate diol is not particularly limited, and may be 100 mass %, with respect to the total amount of the polycarbonate diol and the aldehyde (A), 100%, i.e., the total mass of the composition.

The polycarbonate diol in the present invention can contain at least one of a structural unit (2) derived from a compound (2) to be described later and a structural unit (3) derived from a dihydroxy compound (3) to be described later, if necessary, within a range that does not impair the effects of the present invention.

(Molecular Weight of Polycarbonate Diol)

The lower limit of the number average molecular weight (Mn) of the polycarbonate diol in the present invention is not particularly limited, and is preferably 250 or more, more preferably 300 or more, and still more preferably 400 or more, from the viewpoint of improving the mechanical properties of the obtained polyurethane. On the other hand, the upper limit of the number average molecular weight (Mn) is not particularly limited, and is preferably 5,000 or less, more preferably 4,000 or less, and still more preferably 3,000 or less, from the viewpoint of moderately reducing the viscosity of the polycarbonate diol composition according to the present invention and maintaining good handleability, and from the viewpoint of maintaining good chemical resistance of the obtained polyurethane.

The upper limit and the lower limit can be freely combined. for example, the number average molecular weight (Mn) of the polycarbonate diol in the present invention is preferably 250 or more and 5,000 or less, more preferably 300 or more and 4,000 or less, and still more preferably 400 or more and 3,000 or less.

The number average molecular weight (Mn) is a molecular weight calculated from a hydroxyl value, and the measurement conditions are as described in Examples to be described later.

(Compound (1))

The compound (1) in the present invention is a compound represented by the following general formula (1), and is a raw material for constituting the polycarbonate diol in the present invention. The polycarbonate diol composition according to the present invention contains a polycarbonate diol containing a structural unit (1) derived from a compound (1) represented by the following general formula (1).

$$HO—(CH_2)_n—OH \quad (1)$$

(In the general formula (1), n is an integer of 3 to 6.)

In the general formula (1), n is not particularly limited as long as it is an integer of 3 to 6. From the viewpoint of a handling property and availability of the compound (1), a compound in which n is an integer of 4 to 6, and further a compound in which n is 6 can be used.

In the polycarbonate diol composition according to the present invention, the compound (1) is not particularly limited, and any known dihydroxy compound used as a raw material for a polycarbonate diol can be appropriately selected and used.

Specifically, examples thereof include 1,3-propanediol, 1,4-butanediol, 1,5-pentanediol, and 1,6-hexanediol.

The compound (1) may be used alone or in combination of two or more kinds thereof.

Among them, as the compound (1), a compound (1-1) represented by the following general formula (1-1), that is, 1,6-hexanediol, can be used.

$$HO—(CH_2)_6—OH \quad (1\text{-}1)$$

Therefore, in the polycarbonate diol, the structural unit (1) can include a structural unit derived from the compound (1-1) represented by the general formula (1-1).

In this case, the content ratio of the structural unit derived from the compound (1-1) contained in the structural unit (1) is not particularly limited, and is preferably 10 mass % or more, more preferably 30 mass % or more, still more preferably 50 mass % or more, and particularly preferably 70 mass % or more with respect to 100%, i.e., the total mass of the structural unit (1), from the viewpoint of improving the handleability of the polycarbonate diol and the flexibility and the low-temperature properties of the obtained polyurethane. This content ratio can be 90 mass % or more. On the other hand, the upper limit of the content ratio of the structural unit derived from the compound (1-1) in the structural unit (1) is not particularly limited, and may be 100 mass %, or alternatively, can be 99 mass % or less with respect to 100%, i.e., the total mass of the structural unit (1).

When the polycarbonate diol in the present invention contains the structural unit (1) derived from the compound (1), the obtained polyurethane has good mechanical properties and chemical resistance.

Examples of the structural unit (1) include a structural unit represented by the following general formula (1').

[Chem. 1]

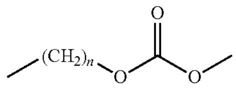

(1')

(In the general formula (1'), n is an integer of 3 to 6.)

The structural unit (1) can contain a structural unit (1-1) derived from a compound (1-1) represented by the following general formula (1-1), that is, a structural unit (1-1) derived from 1,6-hexanediol, from the viewpoint of further improving the mechanical properties and the chemical resistance of the obtained polyurethane.

$$HO—(CH_2)_6—OH \quad (1\text{-}1)$$

Examples of the structural unit (1-1) include a structural unit represented by the following general formula (1-1').

[Chem. 2]

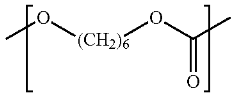

(1-1')

In the polycarbonate diol in the present invention, the lower limit of the content ratio of the structural unit (1) is not particularly limited, and is preferably 40 mass % or more, more preferably 60 mass % or more, still more preferably 75 mass % or more, and particularly preferably 80 mass % or more with respect to 100%, i.e., the total mass of the polycarbonate diol, from the viewpoint of improving the mechanical properties and the chemical resistance of the obtained polyurethane. On the other hand, the upper limit of the content ratio of the structural unit (1) is not particularly limited, and may be 100 mass % or less than 100 mass %. Alternatively, the upper limit is more preferably 98 mass % or less, still more preferably 95 mass % or less, and particularly preferably 90 mass % or less with respect to 100%, i.e., the total mass of the composition, from the viewpoint of maintaining good chemical resistance of the obtained polyurethane.

The upper limit and the lower limit can be freely combined. For example, in the polycarbonate diol in the present invention, the content ratio of the structural unit (1) is preferably 40 mass % or more and 100 mass % or less, more preferably 60 mass % or more and 98 mass % or less, still more preferably 75 mass % or more and 95 mass % or less, and particularly preferably 80 mass % or more and 90 mass % or less with respect to 100%, i.e., the total mass of the polycarbonate diol.

In the polycarbonate diol according to the present invention, a compound (1) derived from a fossil fuel can be used alone as the compound (1).

Alternatively, in the polycarbonate diol according to the present invention, when a compound (1) containing a compound (1) derived from a biological raw material, specifically, the compound (1) derived from a biological raw material alone, or a mixture containing the compound (1) derived from a biological raw material and a compound (1) derived from a fossil fuel is used as the compound (1), it is possible to achieve the sustainable development goals (SDGs). The compound (1) derived from a biological raw material is a compound (1) derived from a non-edible biomass and/or a non-fossil fuel.

In the present invention, the non-edible biomass refers to a resource made from raw materials such as non-edible grasses and trees. Specifically, examples thereof include, but are not limited to, cellulose, hemicellulose, lignin, and the like obtained from a woody biomass such as coniferous trees and broadleaf trees, bioethanol and biodiesel obtained from a herbaceous biomass such as corn and sugarcane stalks, soybeans, and rapeseed, and a waste oil derived from plants.

In the present invention, the non-fossil fuel refers to, for example, hydrogen or an organic matter derived from plants or animals that is not derived from a fossil fuel or a non-edible biomass. Specifically, examples thereof include, but are not limited to, methane and sugar ethanol obtained from firewood, charcoal, dried livestock dung, and the like.

In the present invention, the compound (1) derived from a fossil fuel refers to at least one selected from the group consisting of a compound (1) derived from petroleum, a compound (1) derived from coal, and a compound (1) derived from natural gas.

The compound (1) derived from a biological raw material may contain the above aldehyde (A) depending on the origin. Therefore, the above effects of the present invention can be obtained by controlling the content ratio of the aldehyde (A) in the compound (1) to produce a polycarbonate diol composition, or by controlling the content ratio of the aldehyde (A) in the polycarbonate diol composition produced by using the compound (1).

For example, in the polycarbonate diol in the present invention, as the compound (1-1), 1,6-hexanediol derived from a fossil fuel can be used alone.

Alternatively, in the polycarbonate diol in the present invention, when 1,6-hexanediol including 1,6-hexanediol derived from a biological raw material, specifically, 1,6-hexanediol derived from a biological raw material alone or a mixture containing 1,6-hexanediol derived from a biological raw material and 1,6-hexanediol derived from a fossil fuel is used as the compound (1-1), it is possible to achieve the sustainable development goals (SDGs).

The 1,6-hexanediol derived from a biological raw material is 1,6-hexanediol derived from a non-edible biomass and/or a non-fossil fuel.

In the present invention, the 1,6-hexanediol derived from a fossil fuel refers to at least one selected from 1,6-hexanediol derived from petroleum, 1,6-hexanediol derived from coal, and 1,6-hexanediol derived from natural gas.

The 1,6-hexanediol derived from a biological raw material may contain the above aldehyde (A) depending on the origin. Therefore, the above effects of the present invention can be obtained by controlling the content ratio of the aldehyde (A) in the 1,6-hexanediol to produce a polycarbonate diol composition, or by controlling the content ratio of the aldehyde (A) in the polycarbonate diol composition produced by using the 1,6-hexanediol.

(Compound (2))

The compound (2) in the present invention is a compound represented by the following general formula (2), and can be used as a raw material for constituting the polycarbonate diol in the present invention.

That is, in the polycarbonate diol composition according to the present invention, the polycarbonate diol may contain a structural unit (2) derived from a compound (2) represented by the following general formula (2).

$$HO—R^1—OH \quad (2)$$

(In the general formula (2), $R^1$ represents a divalent alkylene group having 3 to 20 carbon atoms which may have a substituent. However, the compound (2) represented by the general formula (2) does not include the compound (1) represented by the general formula (1).)

In the formula (2), $R^1$ represents a substituted or unsubstituted divalent alkylene group having 3 to 20 carbon atoms.

The structural unit (2) derived from the compound represented by the formula (2) is represented, for example, by the following formula (2').

[Chem. 3]

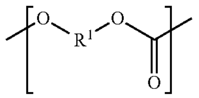

(2')

In the formula (2'), $R^1$ may be one kind of a group or a plurality of kinds of groups. In the formula (2'), $R^1$ is a substituted or unsubstituted divalent alkylene group having 3 to 20 carbon atoms. The carbon atom in the main chain constituting the alkylene group represented by $R^1$ is preferably a secondary, tertiary or quaternary carbon atom, and more preferably a secondary carbon atom, in order to improve the flexibility, the low-temperature properties, the chemical resistance, and the heat resistance.

In the polycarbonate diol composition according to the present invention, when an aliphatic dihydroxy compound having no aromatic ring structure in the molecular structure, such as the compound (2), is used, the polycarbonate diol can be excellent in handleability, and the obtained polyurethane can be excellent in flexibility and chemical resistance.

In the polycarbonate diol in the present invention, the lower limit of the content ratio of the structural unit (2) is not particularly limited, and is preferably 5 mass % or more, more preferably 10 mass % or more, and still more preferably 25 mass % or more with respect to 100%, i.e., the total mass of the polycarbonate diol, from the viewpoint of improving the handleability of the polycarbonate diol, and the flexibility and the chemical resistance of the obtained polyurethane. On the other hand, the upper limit of the content ratio of the structural unit (2) is not particularly limited, and is preferably 95 mass % or less, more preferably 75 mass % or less, and still more preferably 50 mass % or less with respect to 100%, i.e., the total mass of the polycarbonate diol, from the viewpoint of maintaining good handleability of the polycarbonate diol and maintaining good flexibility and low-temperature properties of the obtained polyurethane.

The upper limit and the lower limit can be freely combined. For example, in the polycarbonate diol in the present invention, the content ratio of the structural unit (2) is preferably 5 mass % or more and 95 mass % or less, more preferably 10 mass % or more and 75 mass % or less, and still more preferably 25 mass % or more and 50 mass % or less with respect to 100%, i.e., the total mass of the polycarbonate diol.

In the polycarbonate diol composition according to the present invention, the compound (2) is not particularly limited, and examples thereof include 2-methyl-1,3-propanediol, 2,2-dimethyl-1,3-propanediol, 1,3-butanediol, 2-methyl-1,4-butanediol, 1,7-heptanediol, 1,8-octanediol, 2-methyl-1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,12-octadecanediol, and 1,20-eicosanediol. Among them, 2-methyl-1,3-propanediol, 2,2-dimethyl-1,3-propanediol, 1,3-butanediol, 2-methyl-1,4-butanediol, and 1,10-decanediol are preferred, and 1,10-decanediol is more preferred, in order to obtain an excellent balance of flexibility, low-temperature properties, and chemical resistance of the obtained polyurethane.

These compounds (2) may be used alone or in combination of two or more kinds thereof.

(Dihydroxy Compound (3))

The dihydroxy compound (3) in the present invention is a dihydroxy compound having a moiety represented by the following general formula (3) in a part of the structure, and can be used as a raw material for constituting the polycarbonate diol in the present invention.

That is, in the polycarbonate diol composition according to the present invention, the polycarbonate diol can contain a structural unit (3) derived from the dihydroxy compound (3) having a moiety represented by the following general formula (3) in a part of the structure.

$$-(CH_2-O)- \qquad (3)$$

(However, this excludes a case where the moiety represented by the general formula (3) is a part of $-CH_2-O-H$.)

In the polycarbonate diol composition according to the present invention, when a dihydroxy compound having the moiety represented by the structural unit (3) in the part of the structure, such as the dihydroxy compound (3), is used, the polycarbonate diol can be excellent in handleability, and the obtained polyurethane can be excellent in flexibility and low-temperature properties.

In the polycarbonate diol in the present invention, the lower limit of the content ratio of the structural unit (3) is not particularly limited, and is preferably 5 mass % or more, more preferably 10 mass % or more, and still more preferably 25 mass % or more with respect to 100%, i.e., the total mass of the polycarbonate diol, from the viewpoint of improving the handleability of the polycarbonate diol, and the flexibility and the low-temperature properties of the obtained polyurethane. On the other hand, the upper limit of the content ratio of the structural unit (3) is not particularly limited, and is preferably 95 mass % or less, more preferably 75 mass % or less, and still more preferably 50 mass % or less with respect to 100%, i.e., the total mass of the composition, from the viewpoint of maintaining good handleability of the polycarbonate diol and maintaining good heat resistance and strength of the obtained polyurethane.

The upper limit and the lower limit can be freely combined. For example, in the polycarbonate diol in the present invention, the content ratio of the structural unit (3) is preferably 5 mass % or more and 95 mass % or less, more preferably 10 mass % or more and 75 mass % or less, and still more preferably 25 mass % or more and 50 mass % or less with respect to 100%, i.e., the total mass of the polycarbonate diol.

In the polycarbonate diol composition according to the present invention, the dihydroxy compound (3) is not particularly limited. Examples thereof include: oxyalkylene glycols such as diethylene glycol, triethylene glycol, tetraethylene glycol, and polyethylene glycol; a compound having an aromatic group in the side chain and an ether group bonded to the aromatic group in the main chain, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl)fluorene; anhydrous sugar alcohols typified by a dihydroxy compound represented by the following general formula (4); and a compound having a cyclic ether structure represented by the following general formula (5), such as spiroglycol.

These dihydroxy compounds (3) may be used alone or in combination of two or more kinds thereof.

[Chem. 4]

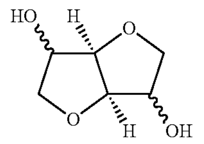

(4)

[Chem. 5]

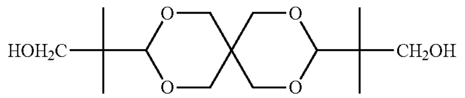

(5)

Among these dihydroxy compounds (3), preferred is a dihydroxy compound having no aromatic ring structure from the viewpoint of light resistance of the obtained polyurethane.

Specifically, examples of the anhydrous sugar alcohols typified by the dihydroxy compound represented by the general formula (4) include at least one selected from isosorbide, isomannide, and isoidide, which are stereoisomers.

These may be used alone or in combination of two or more kinds thereof.

Among them, isosorbide, which is obtained by dehydration and condensation of sorbitol produced from various starches abundant and easily available as plant-derived resources, is most preferred from the viewpoint of availability and ease of production, light resistance, optical properties, moldability, heat resistance, and achievement of the sustainable development goals (SDGs).

[Method for Producing Polycarbonate Diol]

The method for producing a polycarbonate diol according to the present invention is not particularly limited, and a known method for producing a polycarbonate diol can be used, as described in, for example, Schnell, Polymer Reviews, Vol. 9, pp. 9-20 (1994) and WO 2015/199070.

Examples of a specific embodiment of the method for producing a polycarbonate diol composition according to the present invention include polycondensing a carbonate compound to be described later and a dihydroxy compound composition containing a compound (1) to be described later and an aldehyde (A) having 3 or more and 8 or less carbon atoms to be described later by a transesterification reaction in the presence of a catalyst to be described later, to obtain a polycarbonate diol composition containing a polycarbonate diol.

<Dihydroxy Compound Composition>

Examples pf the dihydroxy compound composition include a composition containing a compound (1) and an aldehyde (A) to be described later.

(Compound (1))

The compound (1) in the method for producing a polycarbonate diol composition according to the present invention is a compound represented by the following general formula (1), and compounds same as the compound (1) mentioned in the description of the polycarbonate diol composition according to the present invention can be used.

$$HO—(CH_2)_n—OH \quad (1)$$

(In the general formula (1), n is an integer of 3 to 6.)

Hereinafter, the compound (1) in the method for producing a polycarbonate diol composition according to the present invention can be treated as having the same meaning as the compound (1) in the polycarbonate diol composition according to the present invention.

The compound (1) may be used alone or in combination of two or more kinds thereof.

In the method for producing a polycarbonate diol composition according to the present invention, the compound (1) can contain, if necessary, a compound (1-1) represented by the following general formula (1-1).

$$HO—(CH_2)_6—OH \quad (1\text{-}1)$$

In this case, the content ratio of the compound (1-1) in the compound (1) is not particularly limited, and is preferably 10 mass % or more, more preferably 30 mass % or more, still more preferably 50 mass % or more, and particularly preferably 70 mass % or more with respect to 100%, i.e., the total mass of the compound (1), from the viewpoint of improving the handleability of the polycarbonate diol and the flexibility and the low-temperature properties of the obtained polyurethane. This content ratio can be 90 mass % or more. On the other hand, the upper limit of the content ratio of the compound (1-1) in the compound (1) is not particularly limited, and may be 100 mass %, or alternatively, can be 99 mass % or less with respect to 100%, i.e., the total mass of the compound (1).

(Aldehyde (A))

The aldehyde (A) in the method for producing a polycarbonate diol composition according to the present invention can be treated as having the same meaning as the aldehyde (A) mentioned in the description of the polycarbonate diol composition according to the present invention.

The aldehyde (A) may be used alone or in combination of two or more kinds thereof.

As the aldehyde (A) in the method for producing a polycarbonate diol composition according to the present invention, an aldehyde having an aliphatic hydrocarbon group having 2 or more and 7 or less carbon atoms can be used from the viewpoint of the mechanical properties, the chemical resistance and a reduced variation in the mechanical properties of the obtained polyurethane. Specifically, examples of the aliphatic hydrocarbon group include an aliphatic hydrocarbon group having 2 or more and 7 or less carbon atoms, which may have a branched structure, and which has a linear structure or cyclic structure.

The aldehyde having an aliphatic hydrocarbon group having 2 or more and 7 or less carbon atoms in the method for producing a polycarbonate diol composition according to the present invention can be treated as having the same meaning as the aldehyde having an aliphatic hydrocarbon group having 2 or more and 7 or less carbon atoms mentioned in the description of the polycarbonate diol composition according to the present invention.

Specifically, examples of the aldehyde (A) in the method for producing a polycarbonate diol composition according to the present invention include at least one selected from 6-hydroxyhexanal and adipaldehyde.

In the method for producing a polycarbonate diol according to the present invention, the upper limit of the content ratio of the aldehyde (A) in the dihydroxy compound composition is not particularly limited, and is preferably 900 ppm by mass or less with respect to the total mass of the dihydroxy compound composition, from the viewpoint of maintaining good mechanical properties and chemical resistance of the obtained polyurethane, and from the viewpoint of preventing yellowing and maintaining a good color tone of the obtained polycarbonate diol composition, and improving the polymerization stability during polyurethane polymerization. As the content ratio of the aldehyde (A) is larger, depending on the production conditions in producing a polyurethane using the produced polycarbonate diol composition, the aldehyde (A) reacts with the hydroxy group terminal in the polycarbonate diol or reacts with an isocyanate compound used as a raw material for the polyurethane, whereby a crosslinked structure is formed in the polyurethane during polyurethane polymerization, causing a gelation phenomenon and impairing the polymerization stability. The upper limit of the content ratio of the aldehyde (A) is more preferably 700 ppm by mass or less, still more preferably 500 ppm by mass or less, particularly preferably 400 ppm by mass or less, and especially preferably 300 ppm by mass or less.

On the other hand, the lower limit of the content ratio of the aldehyde (A) is not particularly limited, and is generally preferably 1 ppm by mass or more, more preferably 5 ppm by mass or more, still more preferably 10 ppm by mass or more, particularly preferably 50 ppm by mass or more, and especially preferably 100 ppm by mass or more with respect to the total mass of the dihydroxy compound composition, from the viewpoint of obtaining excellent mechanical properties and chemical resistance and reducing the variation in the mechanical properties of the obtained polyurethane, and from the economic viewpoint of reducing the amount of the aldehyde (A).

The upper limit and the lower limit can be freely combined. For example, the content ratio of the aldehyde (A) contained in the dihydroxy compound composition in the method for producing a polycarbonate diol according to the present invention is not particularly limited, and is preferably 1 ppm by mass or more and 900 ppm by mass or less, more preferably 5 ppm by mass or more and 700 ppm by mass or less, still more preferably 10 ppm by mass or more and 500 ppm by mass or less, particularly preferably 50 ppm by mass or more and 400 ppm by mass or less, and especially preferably 100 ppm by mass or more and 300 ppm by mass or less with respect to the total mass of the dihydroxy compound composition.

The method for controlling the content ratio of the aldehyde (A) in the dihydroxy compound composition is not particularly limited. For example, when the compound (1) is obtained by subjecting a carboxylic acid or a carboxylic acid ester to a hydrogenation reaction, the content ratio of the aldehyde (A) can be controlled by adjusting a conversion rate of the carboxylic acid or the carboxylic acid ester in the hydrogenation reaction step.

For example, in the stage for producing the dihydroxy compound composition, as a method of reducing the content ratio of the aldehyde (A), the larger the conversion rate, the smaller the content ratio of the aldehyde (A) in the obtained dihydroxy compound composition. On the other hand, in the stage for producing the dihydroxy compound composition, as a method of increasing the content ratio of the aldehyde (A), since the content ratio of the aldehyde (A) in the dihydroxy compound composition increases by oxidation, the content ratio of the aldehyde (A) can be increased to a desired value, for example, by heating the dihydroxy compound composition in a raw material tank or the like in the presence of oxygen.

In the stage for producing the dihydroxy compound composition, in order to reduce the content ratio of the aldehyde (A), methods that can be used include increasing the amount of the catalyst used in the hydrogenation reaction of the carboxylic acid or the carboxylic acid ester that is a raw material for the dihydroxy compound, increasing the residence time, or excessively increasing the hydrogen pressure, but it is not easy since it places a large burden on the production stage.

In addition, the acetal (A) requires a hydrogenation catalytic activity different from that of the aldehyde (A), and is therefore difficult to undergo a hydrogenation reaction with a hydrogenation catalyst for the aldehyde (A), and the acetal (A) remains in the compound (1).

Further, after the hydrogenation reaction step, the compound (1) can be subjected to distillation and purification by distillation. At this time, the acetal (A) produced as a by-product in the hydrogenation reaction step in the distillation stage may decompose into the aldehyde (A), which may be mixed into the purified compound (1). In addition, the aldehyde (A) may react with a hydroxy group to generate an acetal, which may be mixed into the compound (1).

In general, the aldehyde (A) in the dihydroxy compound composition having a small number of carbon atoms can be relatively easily separated by distillation and purification. However, in the case where boiling points of the compound (1) and the aldehyde (A) are close to each other and it is difficult to separate them as the acetal (A), the aldehyde (A) and the acetal (A) tend to remain in the compound (1).

Further, in the method for producing a polycarbonate diol composition according to the present invention, the upper limit of the content ratio of the aldehyde (A) in the obtained polycarbonate diol composition is not particularly limited, and is preferably 440 ppm by mass or less, more preferably 350 ppm by mass or less, and still more preferably 300 ppm by mass or less with respect to the total mass of the composition, for the reasons same as the reasons described for the polycarbonate diol composition according to the present invention. On the other hand, the lower limit of the content ratio of the aldehyde (A) is not particularly limited, and is generally 1 ppm by mass or more, preferably 5 ppm by mass or more, more preferably 15 ppm by mass or more, and still more preferably 50 ppm by mass or more with respect to the total mass of the composition, for the reasons same as the reasons described for the polycarbonate diol composition according to the present invention.

The upper limit and the lower limit can be freely combined. For example, in the method for producing a polycarbonate diol composition according to the present invention, the content ratio of the aldehyde (A) contained in the obtained polycarbonate diol composition is preferably 1 ppm by mass or more and 440 ppm by mass or less, more preferably 5 ppm by mass or more and 400 ppm by mass or less, still more preferably 15 ppm by mass or more and 350 ppm by mass or less, and particularly preferably 50 ppm by mass or more and 300 ppm by mass or less with respect to the total mass of the composition.

(Molecular Weight of Polycarbonate Diol)

In the method for producing a polycarbonate diol composition according to the present invention, the number average molecular weight (Mn) of the obtained polycarbonate diol is preferably 250 or more and 5,000 or less, more preferably 300 or more and 4,000 or less, and still more preferably 400 or more and 3,000 or less, for the reasons same as the reasons described for the polycarbonate diol composition according to the present invention.

(Compound (2) and Dihydroxy Compound (3))

In the method for producing a polycarbonate diol composition according to the present invention, the dihydroxy compound composition preferably further contains at least one of a compound (2) represented by the following general formula (2) and a dihydroxy compound (3) having a moiety represented by the following general formula (3) in a part of the structure, for the reasons same as the reasons described for the polycarbonate diol composition according to the present invention.

$$HO—R^1—OH \quad (2)$$

(In the general formula (2), $R^1$ represents a divalent alkylene group having 3 to 20 carbon atoms which may have a substituent. However, the compound (2) represented by the general formula (2) does not include the compound (1) represented by the general formula (1))

$$—(CH_2—O)— \quad (3)$$

(However, this excludes a case where the moiety represented by the general formula (3) is a part of $—CH_2—O—H$.)

As the compound (2) and the dihydroxy compound (3) in the method for producing a polycarbonate diol composition according to the present invention, compounds respectively same as the compound (2) and the dihydroxy compound (3) mentioned in the description of the polycarbonate diol composition according to the present invention can be used. Hereinafter, the compound (2) and the dihydroxy compound (3) in the method for producing a polycarbonate diol composition according to the present invention can be treated as having the same meaning as the compound (2) and the dihydroxy compound (3) mentioned in the description of the polycarbonate diol composition according to the present invention.

In the method for producing a polycarbonate diol composition according to the present invention, the lower limits and the upper limits of the content ratios of the structural unit (2) and the structural unit (3) in the obtained polycarbonate diol are the same as the lower limits and the upper limits of the content ratios of the structural unit (2) and the structural unit (3) in the polycarbonate diol according to the present invention, respectively.

In the method for producing a polycarbonate diol composition according to the present invention, the dihydroxy compound (3) is preferably at least one selected from isosorbide, isomannide, and isoidide, for the reasons same as the reasons described for the polycarbonate diol composition according to the present invention.

<Carbonate Compound>

A carbonate compound (may be referred to as a "carbonic acid diester") that can be used in the method for producing a polycarbonate diol composition according to the present invention is not particularly limited as long as it does not impair the effects of the present invention. Examples thereof include known carbonate compounds used in the synthesis of a polycarbonate diol, such as a dialkyl carbonate, a diaryl carbonate, or an alkylene carbonate. These carbonate compounds can be appropriately selected by those skilled in the art depending on the use of the polycarbonate diol, the production conditions, and the like. For example, the carbonate compound is preferably a diaryl carbonate from the viewpoint of the reactivity of the dihydroxy compound and the carbonate compound. The carbonate compound is preferably a dialkyl carbonate or an alkylene carbonate from the economic viewpoint.

Specific examples of the carbonate compound include dimethyl carbonate, diethyl carbonate, dibutyl carbonate, diphenyl carbonate, and ethylene carbonate.

The amount of the carbonate compound to be used is not particularly limited, and for example, the conditions described in WO 2015/199070 can be appropriately optimized and used by those skilled in the art according to known techniques.

<Catalyst>

In the method for producing a polycarbonate diol composition according to the present invention, when polycondensing a dihydroxy compound composition and a carbonate compound by a transesterification reaction to obtain a polycarbonate diol composition containing a polycarbonate diol, as a catalyst for promoting the transesterification reaction, a known transesterification catalyst (hereinafter may be referred to as a "catalyst") used in the synthesis of a polycarbonate diol can be used.

In this case, when the catalyst remains in the obtained polycarbonate diol in an excessive amount, in production of a polyurethane by using the polycarbonate diol, the catalyst may inhibit the reaction or excessively accelerate the reaction.

The kind of the catalyst and the amount of the catalyst remaining in the polycarbonate diol are not particularly limited, and for example, the conditions described in WO 2015/199070 can be appropriately optimized and used by those skilled in the art according to known techniques.

<Catalyst Deactivator>

As described above, in the case of using a catalyst during the polymerization reaction, the catalyst generally remains in the obtained polycarbonate diol, and due to the remaining catalyst, a rise in molecular weight, a change in composition, and the like may occur when the polycarbonate diol is heated, or a polyurethanization reaction may not be controlled. In order to prevent the influence of the remaining catalyst, if necessary, the transesterification catalyst can be deactivated by adding, for example, a catalyst deactivator such as a phosphorus-based compound in a substantially equimolar amount to the transesterification catalyst used. Further, after the addition, by applying a heat treatment and the like, the transesterification catalyst can be efficiently deactivated.

The kind and the amount of the catalyst deactivator to be used, and the conditions in the heat treatment are not particularly limited, and for example, the conditions described in WO 2015/199070 can be appropriately optimized and used by those skilled in the art according to known techniques.

[Polyurethane]

A polyurethane according to the present invention is a polyurethane produced using the polycarbonate diol composition according to the present invention.

The method for producing the polyurethane according to the present invention is not particularly limited, and for example, known polyurethane reaction conditions described in WO 2015/016261, WO 2018/088575, and the like can be appropriately optimized and used by those skilled in the art according to known techniques.

For example, the polyurethane according to the present invention can be produced by reacting the polycarbonate diol composition according to the present invention with a polyol other than the polycarbonate diol according to the present invention, which is used if necessary, a polyisocyanate to be described later, and a chain extender to be described later, which is further used if necessary, at a temperature in the range of room temperature to 200 °C.

In the case of using a chain extender, the chain extender may be added from the beginning of the reaction or during the reaction. For example, the polyurethane according to the present invention can be produced by first reacting the polycarbonate diol composition according to the present invention with an excess of polyisocyanate to produce a prepolymer having an isocyanate group at the terminal, and then adding a chain extender to react with the prepolymer to increase the degree of polymerization of the polymer.

<Polyisocyanate>

As the polyisocyanate used in the production of the polyurethane according to the present invention, any known polyisocyanate for use in the production of a polyurethane can be used.

The polyisocyanate is not particularly limited, and examples thereof include various aliphatic, alicyclic, or aromatic polyisocyanate compounds described in WO 2015/016261 and WO 2018/088575.

Specifically, examples thereof include: known aliphatic diisocyanates such as tetramethylene diisocyanate, pentamethylene diisocyanate, hexamethylene diisocyanate, and 2,2,4-trimethylhexamethylene diisocyanate; known alicyclic diisocyanates such as 1,4-cyclohexane diisocyanate, isophorone diisocyanate, 4,4'-dicyclohexylmethane diisocyanate, and 1,3-bis(isocyanatomethyl)cyclohexane; and known aromatic diisocyanates such as xylylene diisocyanate, 4,4'-diphenyl diisocyanate, m-phenylene diisocyanate, p-phenylene diisocyanate, 4,4'-diphenylmethane diisocyanate, and 4,4'-diphenyldimethylmethane diisocyanate. These may be used alone or in combination of two or more kinds thereof.

Among them, in view of a preferred balance of physical properties of the obtained polyurethane and mass availability at a low cost in industry, 4,4'-diphenylmethane diisocyanate, hexamethylene diisocyanate, 4,4'-dicyclohexylmethane diisocyanate, and isophorone diisocyanate are preferred.

<Chain Extender>

As the chain extender used in the production of the polyurethane according to the present invention, any known chain extender for use in the production of a polyurethane can be used.

The chain extender is not particularly limited, and examples thereof include low molecular weight polyols, amines, water, and the like described in WO 2015/016261 and WO 2018/088575.

Specifically, examples thereof include: linear diols such as ethylene glycol, 1,3-propanediol, 1,4-butanediol, 1,5-pentanediol, 1,6-hexanediol, 1,8-octanediol, 1,9-nonanediol, 1,10-decanediol, and 1,12-dodecanediol; branched chain diols such as 2-methyl-1,3-propanediol and 2,2-dimethyl-1,3-propanediol; diols having an ether group, such as diethylene glycol and propylene glycol; diols having an alicyclic structure, such as 1,4-cyclohexanediol, 1,4-cyclohexanedimethanol, and 1,4-dihydroxyethylcyclohexane; diols having an aromatic group, such as xylylene glycol, 1,4-dihydroxyethylbenzene, and 4,4'-methylenebis(hydroxyethylbenzene); polyols such as glycerin, trimethylolpropane, and pentaerythritol; hydroxyamines such as N-methylethanolamine and N-ethylethanolamine; polyamines such as ethylenediamine, 1,3-diaminopropane, hexamethylene diamine, triethylenetetramine, diethylenetriamine, isophoronediamine, 4,4'-diaminodicyclohexylmethane, 2-hydroxyethylpropylenediamine, 4,4'-diphenylmethanediamine, xylylenediamine, diphenyldiamine, hydrazine, and piperazine; and water. These chain extenders may be used alone or in combination of two or more kinds thereof.

Among them, in view of a preferred balance of physical properties of the obtained polyurethane and mass availability at a low cost in industry, ethylene glycol, 1,4-butanediol, 1,5-pentanediol, 1,6-hexanediol, 1,8-octanediol, 1,9-nonanediol, 1,10-decanediol, 1,4-cyclohexanedimethanol, 1,4-dihydroxyethylcyclohexane, ethylenediamine, 1,3-diaminopropane, isophoronediamine, and 4,4'-diaminodicyclohexylmethane are preferred.

<Chain Terminator>

In the production of the polyurethane according to the present invention, for the purpose of controlling the molecular weight of the polyurethane, a known chain terminator for use in the production of a polyurethane can be used, if necessary.

The chain terminator is not particularly limited, and examples thereof include a compound having one active hydrogen group, as described in WO 2015/016261 and WO 2018/088575.

Specifically, examples thereof include monohydric alcohols such as methanol, ethanol, propanol, butanol, and hexanol, and secondary amines such as diethylamine, dibutylamine, di-n-propylamine, n-butylamine, monoethanolamine, and diethanolamine. These may be used alone or in combination of two or more kinds thereof.

<Catalyst>

In the production of the polyurethane according to the present invention, a known catalyst for use in the production of a polyurethane can be used.

The catalyst is not particularly limited, and for example, known polymerization catalysts such as tertiary amines and organic metal salts of tin, titanium, and the like described in WO 2015/016261 and WO 2018/088575 can be used.

<Solvent>

In the production of the polyurethane according to the present invention, a solvent may be used, if necessary.

The solvent is not particularly limited, and examples thereof include a solvent described in WO 2015/016261 and WO 2018/088575.

Specifically, examples thereof include dimethylformamide, diethylformamide, dimethylacetamide, dimethylsulfoxide, tetrahydrofuran, methyl isobutyl ketone, dioxane, cyclohexanone, benzene, toluene, and ethyl cellosolve. These may be used alone or in combination of two or more kinds thereof.

<Amount to be Used and Use Method>

In a method for producing the polyurethane according to the present invention, the amounts to be used and the use methods of the polyisocyanate, the chain extender, the chain terminator, the catalyst, and the solvent are not particularly limited, and the conditions described in WO 2015/016261 and WO 2018/088575 can be appropriately optimized and used by those skilled in the art according to known techniques.

<Weight Average Molecular Weight (Mw) and Molecular Weight Distribution (Mw/Mn) of Polyurethane>

The lower limit of the weight average molecular weight (Mw) of the polyurethane according to the present invention is not particularly limited, and is preferably 50,000 or more, more preferably 100,000 or more, and still more preferably 150,000 or more, from the viewpoint of improving the mechanical properties and the chemical resistance of the obtained polyurethane. On the other hand, the upper limit of the weight average molecular weight (Mw) is not particularly limited, and is preferably 500,000 or less, more preferably 300,000 or less, and still more preferably 200,000 or less, from the viewpoint of maintaining good chemical resistance of the obtained polyurethane.

The upper limit and the lower limit can be freely combined. For example, the weight average molecular weight (Mw) of the polyurethane according to the present invention is preferably 50,000 or more and 500,000 or less, more preferably 100,000 or more and 300,000 or less, and still more preferably 150,000 or more and 200,000 or less.

The lower limit of the molecular weight distribution (Mw/Mn) of the polyurethane according to the present invention is not particularly limited, and is preferably 1.50 or more, more preferably 2.00 or more, and still more preferably 2.50 or more, from the viewpoint of improving the mechanical properties and the chemical resistance of the obtained polyurethane. On the other hand, the upper limit of the molecular weight distribution (Mw/Mn) is not particularly limited, and is preferably 4.00 or less, more preferably 3.00 or less, and still more preferably 2.90 or less, from the viewpoint of maintaining good mechanical properties and chemical resistance of the obtained polyurethane.

The upper limit and the lower limit can be freely combined. For example, the molecular weight distribution (Mw/Mn) of the polyurethane according to the present invention is preferably 1.50 or more and 4.00 or less, more preferably 2.00 or more and 3.00 or less, and still more preferably 2.50 or more and 2.90 or less.

The weight average molecular weight (Mw) and the molecular weight distribution (Mw/Mn) are measured by gel permeation chromatography (GPC measurement), and the measurement conditions are as described in Examples to be described later.

<Application of Polyurethane>

The polyurethane according to the present invention is excellent in mechanical properties and chemical resistance, and has good heat resistance and weather resistance, and can thus be widely used for a foam, an elastomer, an elastic fiber, a coating material such as an aqueous polyurethane coating material, a fiber, a pressure-sensitive adhesive, an adhesive, a floor material, a sealant, a medical material, an artificial leather, a synthetic leather, a coating agent, an active energy ray-curable polymer composition, and the like.

Particularly, in the case of being used for applications such as an active energy ray-curable polymer composition, an artificial leather, a synthetic leather, a coating material such as an aqueous polyurethane coating material, a coating agent, an elastic fiber, a pressure-sensitive adhesive, and an adhesive, the polyurethane according to the present invention has a good balance of chemical resistance, flexibility, heat resistance, and weather resistance, and can thus have good properties such as high durability in portions that come into contact with human skin or that are used with cosmetic agents or disinfection alcohol, sufficient flexibility, and resistance to physical impacts. In addition, the polyurethane according to the present invention can also be suitably used for automotive applications requiring heat resistance or outdoor applications requiring weather resistance.

[Effects]

Since the polycarbonate diol composition according to the present invention contains the aldehyde (A), the variation in mechanical properties of the obtained polyurethane are reduced. The reason for this is unclear, but is presumed to be as follows.

According to the investigations of the inventors of the present invention, in the case where a polyurethane is polymerized using the polycarbonate diol composition containing the aldehyde (A), the aldehyde (A) undergoes a condensation reaction with the polycarbonate diol or a chain extender to generate an acetal, thereby forming a branched structure in the polyurethane structure. It has also been found that the presence of the branched structure in this polyurethane structure improves the viscosity of the polyurethane or a composition containing the polyurethane. As a result, the uniformity of the polyurethane composition can be efficiently improved by stirring. When the viscosity is moderately improved, the coating stability and the molding stability of the polyurethane or a composition containing the polyurethane are improved, and the dimensional stability of the obtained film-like material, fiber-like material, and other molded articles is improved. From these, it is presumed that the variation in mechanical properties of the obtained polyurethane product is reduced.

Further, since the polycarbonate diol composition according to the present invention contains the aldehyde (A), the obtained polyurethane has good mechanical properties and chemical resistance, with an excellent balance between the two. The reason for this is unclear, but is presumed to be as follows.

According to the investigations of the inventors of the present invention, in the case where a polyurethane is polymerized using the polycarbonate diol composition containing the aldehyde (A), as described above, a part of the aldehyde (A) forms a branched structure in the polyurethane structure, whereby the molecular weight distribution of the obtained polyurethane is wider, and the amounts of the high molecular weight component and the crosslinked component in the polyurethane increase. As a result, it is presumed that the obtained polyurethane has improved strength at break, elongation at break, and chemical resistance.

In the case where a good color tone is required for the polycarbonate diol composition or the obtained polyurethane, in the polycarbonate diol composition according to the present invention, when the content ratio of the aldehyde (A) is set to a predetermined value or less, specifically, to 440 ppm by mass or less, the yellowing can be prevented and a good color tone be maintained in the obtained polycarbonate diol composition. As a result, the color tone of the obtained polyurethane can be improved. The reason for this is unclear, but is presumed to be as follows.

According to the investigations of the inventors of the present invention, a dihydroxy compound composition, which is a raw material for the polycarbonate diol composition, may contain the aldehyde (A). Such an aldehyde (A) is generated by oxidation of the dihydroxy compound or dealcoholization of an acetal compound, or is generated as a by-product during synthesis of the dihydroxy compound.

Then, when a dihydroxy compound and a carbonate compound are polycondensed by a transesterification reaction in the presence of a catalyst, the aldehyde (A) generates radicals, and an aldehyde group, a carboxylic acid, a double bond, and the like are generated in the dihydroxy compound or polycarbonate diol structure, forming a conjugated structure. From this, it is presumed that the polycarbonate diol composition turns yellow and the color tone deteriorates. Alternatively, in the case where the polycarbonate diol composition contains the aldehyde (A), when the composition is stored for a long period of time, the aldehyde (A) generates radicals due to factors such as oxygen contamination, and an aldehyde group, a carboxylic acid, a double bond, and the like are generated in the dihydroxy compound composition or polycarbonate diol structure, forming a conjugated structure. From this, it is also presumed that the polycarbonate diol composition turns yellow and the color tone deteriorates.

EXAMPLES

Hereinafter, the present invention will be described more specifically with reference to Examples and Comparative Examples. The present invention is not limited to these Examples as long as the scope of the present invention is not exceeded.

[Evaluation Method]

In the following, the evaluation methods for respective physical values are as follows.

<Content Ratio of Aldehyde (A) in Dihydroxy Compound Composition>

The content ratio of the aldehyde (A) in the dihydroxy compound composition including 1,6-hexanediol as the dihydroxy compound as the compound (1) used in Examples and Comparative Examples was measured according to the following procedure.

In this evaluation, the "aldehyde (A)" refers to 6-hydroxyhexanal, and the definition of "the content ratio of the aldehyde (A)" is as described above in the description for the aldehyde (A).

In this evaluation, the "aldehyde (A) in 1,6-hexanediol" means the aldehyde (A) in a 1,6-hexanediol composition containing 1,6-hexanediol as a major component and the aldehyde (A) as a minor component. The expression "containing as a main component" means that the component is contained in an amount of 95.0 mass % or more with respect to 100 mass %, i.e., the total mass of the composition.

1,6-Hexanediol was dissolved in $CDCl_3$, and $^1$H-NMR measurement was carried out using a nuclear magnetic resonance spectrometer (400 MHz, model name: ECZ-400, manufactured by JEOL Ltd.) under conditions of a measurement temperature of 30 °C and an accumulation number of 32 times.

From the obtained $^1$H-NMR measurement result, using an integral value a of the peak of the 1H proton of the aldehyde group in the aldehyde (A) (6-hydroxyhexanal) present at δ of 9.80 ppm to 9.75 ppm, an integral value b of the peak of the 4H proton of the α-methylene group in 1,6-hexanediol present at δ of 3.69 ppm to 3.50 ppm, and the following equation, the content ratio (unit:mass %) of the aldehyde (A) in the dihydroxy compound composition with respect to 100%, i.e., the total mass of the dihydroxy compound composition was calculated.

$$\text{CONTENT RATIO (UNIT: MASS \%) OF ALDEHYDE } (A) = \frac{a \times M(\text{ALDEHYDE } (A)) \times 100}{a \times M(\text{ALDEHYDE } (A) + \{(b - 2 \times a)/4\} \times M(16HD)} \quad \text{[Math. 1]}$$

In the above equation, "M(aldehyde (A))" represents the molecular weight (=116) of the aldehyde (A) (6-hydroxyhexanal), and "M(16HD)" represents the molecular weight (=118) of 1,6-hexanediol.

In addition, for the content ratio of the aldehyde (A) in the dihydroxy compound composition including 1,6-hexanediol and 1,4-butanediol or isosorbide as dihydroxy compounds used in Examples, similarly, the content ratio (unit:mass %) of the aldehyde (A) in the dihydroxy compound composition with respect to 100%, i.e., the total mass of the dihydroxy compound composition was calculated based on the $^1$H-NMR measurement result, using the integral value of the peak of the proton of the aldehyde group in the aldehyde (A) (6-hydroxyhexanal), the integral value of the peak of the proton of the α-methylene group in each dihydroxy compound, the molecular weight of each dihydroxy compound, and an equation based on the above equation. At this time, "M(14BG)" was used as the molecular weight (=90) of 1,4-butanediol, and "M(ISB)" was used as the molecular weight (=146) of isosorbide.

<Content Ratio of aldehyde (A) in Polycarbonate Diol Composition>

The content ratio of the aldehyde (A) in each of the polycarbonate diol compositions obtained in Examples and Comparative Examples was measured according to the following procedure. In this evaluation, the definitions of the "aldehyde (A)" and the "content ratio of the aldehyde (A)" are as described above in the description for the aldehyde (A).

The polycarbonate diol composition was dissolved in $CDCl_3$, and $^1$H-NMR measurement was carried out using a nuclear magnetic resonance spectrometer (400 MHz, model name: ECZ-400, manufactured by JEOL Ltd.) under conditions of a measurement temperature of 30 °C and an accumulation number of 64 times. From the obtained $^1$H-NMR measurement result, three peaks observed at the following signal positions were identified, and integral values A to C of each peak were obtained.

- Integral value of 1H proton of aldehyde group in aldehyde (A) present at δ of 9.80 ppm to 9.75 ppm=A
- Integral value of 2H proton peak of methylene group next to hydroxy group terminal in polycarbonate diol present at δ of 3.69 ppm to 3.50 ppm=B
- Integral value of 4H proton peak of γ-methylene group of structure derived from 1,6-hexanediol in polycarbonate diol present at δ of 1.49 ppm to 1.30 ppm=C The integral value of the peak derived from the structural unit at the polycarbonate diol terminal derived from the aldehyde (A) was defined as "$ALD_m$".

Similarly, the integral value of the peak derived from the structural unit at the polycarbonate diol terminal derived from 1,6-hexanediol (hereinafter abbreviated as "16HD") was defined as "$16HD_m$".

In addition, the integral value of the peak derived from the structural unit derived from 16HD in the polycarbonate diol other than the polycarbonate diol terminal was defined as "$16HD_o$".

Based on the number of protons of the structural unit derived from the aldehyde (A), the structural unit derived from DPC, and the structural unit derived from 16HD, the integral value of the peak derived from each of the structural units described above was calculated using the following equations.

$$ALD_m = A$$

$$16HD_m = B \div 2$$

$$16HD_o = (C - 16HD_m \times 4) \div 4$$

Next, the number average molecular weight M(PCD) of the polycarbonate diol was calculated using the following equation.

$$(\text{DIOL UNIT NUMBER}) = \frac{16HD_o + 16HD_m}{16HD_m/2} \qquad \text{[Math. 2]}$$

$$M(PCD) = \begin{pmatrix}\text{DIOL UNIT}\\ \text{NUMBER}\end{pmatrix} \times M(16HD_o) + \left\{\begin{pmatrix}\text{DIOL UNIT}\\ \text{NUMBER}\end{pmatrix} - 1\right\} \times M(\text{CARBONYL GROUP}) + 2$$

In the above equation, $M(16HD_o)$ refers to the molecular weight (=116) of the structural unit derived from 16HD in the polycarbonate diol other than the polycarbonate diol terminal, and M(carbonyl group) refers to the molecular weight (=28) of the carbonyl group.

Next, the content ratio (unit:mass %) of the aldehyde (A) with respect to 100%, i.e., the total mass of the polycarbonate diol (PCD) composition was calculated using the above value and the following equation.

$$\text{CONTENT RATIO (UNIT: MASS \%) OF ALDEHYDE } (A) = \frac{ALDm \times M(\text{ALDEHYDE } (A)) \times 100}{ALDm \times M(\text{ALDEHYDE } (A) + M(PCD) \times 16HDm/2} \qquad \text{[Math. 3]}$$

In the above equation, "M(aldehyde (A))" represents the molecular weight (=116) of the aldehyde (A) (6-hydroxyhexanal).

In addition, for the content ratio of the aldehyde (A) in the polycarbonate diol composition including 1,6-hexanediol and 1,4-butanediol or isosorbide as dihydroxy compounds used in Examples, similarly, the content ratio (unit:mass %) of the aldehyde (A) in the polycarbonate diol composition with respect to 100%, i.e., the total mass of the polycarbonate diol (PCD) composition was calculated based on the $^1$H-NMR measurement result, using the integral value of the peak derived from the structural unit at the polycarbonate diol terminal, the integral value of the peak derived from the structural unit in the polycarbonate diol other than the polycarbonate diol terminal, the number average molecular weight M(PCD) of the polycarbonate diol, and an equation based on the above equation.

<Content Ratio of Formyl Terminal Group of Polycarbonate Diol>

The content ratio of the formyl terminal group in the polycarbonate diol in each of the polycarbonate diol compositions obtained in Examples and Comparative Examples was measured according to the following procedure.

Unreacted substances were removed from the polycarbonate diol composition by thin-film distillation to be described later. The obtained reaction product was dissolved in $CDCl_3$, and $^1$H-NMR measurement was carried out using a nuclear magnetic resonance spectrometer (400 MHz, model name: ECZ-400, manufactured by JEOL Ltd.) under conditions of a measurement temperature of 30 °C and an accumulation number of 128 times.

From the obtained $^1$H-NMR measurement result, two peaks observed at the following signal positions were identified, and integral values A and B of each peak were obtained. The content ratio (unit: mol %) of the formyl terminal group with respect to 100 mol % of total terminal groups in the polycarbonate diol was calculated using the following equation.

- Integral value of 1H proton of aldehyde group in aldehyde (A) present at δ of 9.80 ppm to 9.75 ppm=A Integral value of 2H proton peak of methylene group next to hydroxy group terminal in polycarbonate diol present at δ of 3.69 ppm to 3.50 ppm=B $$\text{CONTENT RATIO (mol \%) OF FORMYL TERMINAL GROUP} = \frac{A \times 100}{A + B/2} \quad \text{[Math. 4]}$$

<Color Tone of Polycarbonate Diol Composition>

As the index of the color tone of each of the polycarbonate diol compositions obtained in Examples and Comparative Examples, the APHA value of a polycarbonate diol composition sample was measured according to JIS K0071-1 (1998) by comparing the sample with a standard solution charged into a color comparison tube. A color standard solution 1000 degree (1 mgPt/mL) (manufactured by Kishida Chemical Co., Ltd.) was used as the reagent.

<Number Average Molecular Weight (Mn) Determined Based on Hydroxyl Value of Polycarbonate Diol>

The hydroxyl value (unit: mgKOH/g) of each of the polycarbonate diol compositions obtained in Examples and Comparative Examples was measured by a method using an acetylation reagent according to JIS K1557-1. Next, the number average molecular weight (Mn) of the polycarbonate diol was calculated based on the obtained hydroxyl value using the following equation.

$$\text{Number average molecular weight } (Mn) = (\text{molecular weight of } KOH) \times 2000/\text{hydroxyl value}$$

<Mass Average Molecular Weight (Mw) and Number Average Molecular Weight (Mn) of Polyurethane>

The mass average molecular weight (Mw) and number average molecular weight (Mn) of each of the polyurethanes obtained in Examples and Comparative Examples were determined by gel permeation chromatography (GPC measurement) according to the following procedure.

A polyurethane sample was dissolved in dimethylacetamide (containing 0.3 mass % of anhydrous lithium bromide) to have a polyurethane concentration of 0.07 mass %, and the resultant was used as a GPC measurement sample. The GPC measurement was carried out using a GPC device (model name: HLC-8420 manufactured by Tosoh Corporation, column: TSKgel SuperAWM-H×2, manufactured by Tosoh Corporation), under the measurement conditions of a sample injection amount of about 40 μL, a column temperature of 40 °C, a measurement solvent (mobile phase) of dimethylacetamide (containing 0.3 mass % of anhydrous lithium bromide), and a flow rate of 0.6 mL/min.

The molecular weight of the polyurethane was measured in terms of the number average molecular weight (Mn), the weight average molecular weight (Mw), and the molecular weight distribution (Mw/Mn) in terms of standard polystyrene using a commercially available monodisperse polystyrene solution as a standard sample.

<Viscosity of Polyurethane Solution>

The viscosity of each of the polyurethane solutions obtained in Examples and Comparative Examples was measured at 40 °C using an E-type viscometer (device name: TV-100EH, cone: 3°×R14, manufactured by Toki Sangyo Co., Ltd.).

<Mechanical Properties of Polyurethane>

As an index of the mechanical properties of the polyurethane, a tensile test was carried out on the polyurethane using the following method to evaluate various mechanical properties.

A solution of each of the polyurethanes obtained in Examples and Comparative Examples was applied onto a 0.1 mm thick fluororesin sheet (trade name: fluorine tape "NITOFLON 900", manufactured by Nitto Denko Corporation) using an applicator having a clearance of 500 μm, and dried at a temperature of 80 °C for 1 hour, then at 100 °C for 0.5 hours, and further at 100 °C in a vacuum state for 1.0 hour to dry off the solvent (DMF), and then allowed to stand at a constant temperature and humidity of 23 °C and 55% RH for 12 hours or longer to obtain a laminated film in which a polyurethane layer was formed on the surface of the fluororesin sheet. The thickness of the polyurethane layer after drying was 100 μm.

The polyurethane layer was peeled off from the obtained laminated film, and then a rectangular polyurethane film (length: 150 mm, width: 10 mm, thickness: 100 μm) was cut out to prepare a tensile test sample piece.

(Tensile Test)

The above tensile test sample piece was subjected to a tensile test according to JIS K 6301 (2010) using a tabletop precision universal testing machine (product name: Autograph AGS-X, manufactured by Shimadzu Corporation) under conditions of a chuck-to-chuck distance of 50 mm, a tensile speed of 500 mm/min, and a temperature of 23 °C. (relative humidity: 60%). The measurement was carried out using four tensile test sample pieces, and average values and standard deviations of each of a 100% modulus, a 300% modulus, and the stress (strength at break) and the elongation (elongation at break) at the time when the test pieces broke were measured.

The following equation was used to calculate the coefficient of variation of each of the 100% modulus, the 300% modulus, the strength at break, and the elongation at break.

$$\text{Coefficient of variation (\%)} = (\text{standard deviation/average value}) \times 100$$

<Chemical Resistance of Polyurethane>

As an index of the chemical resistance of the polyurethane, a mass change rate when the polyurethane was immersed in a test solution was measured using the following method.

A solution of each of the polyurethanes obtained in Examples and Comparative Examples was applied onto a 0.1 mm thick fluororesin sheet (trade name: fluorine tape "NITOFLON 900", manufactured by Nitto Denko Corporation) using an applicator having a clearance of 500 μm, and dried at a temperature of 80 °C for 1 hour, then at 100 °C for 0.5 hours, and further at 100 °C in a vacuum state for 1.0 hour to dry off the solvent (DMF), to obtain a laminated film in which a polyurethane layer was formed on the surface of the fluororesin sheet. The thickness of the polyurethane layer after drying was 100 μm.

The polyurethane layer was peeled off from the obtained laminated film, and then a square polyurethane film (length: 3 cm, width: 3 cm, thickness: 100 μm) was cut out to prepare a chemical resistance test sample piece.

(Ethanol Resistance Test)

After measuring the weight of the chemical resistance test piece using a precision balance, the sample piece was charged into a glass-made petri dish having an inner diameter of 10 cmφ and containing 50 mL of ethanol as a test solvent and immersed in the solvent at room temperature of about 23 °C for 1 hour. After the test, the test piece was taken out and the front and back surfaces thereof were lightly wiped with a paper wiper and by performing mass measurement using a precision balance, the mass change rate (percentage increase) was calculated based on the change in mass of the test piece before and after the test. A mass change rate closer to 0% indicates that the ethanol resistance is better.

[Raw Material to be Used]

The abbreviations for the raw materials used in Examples and Comparative Example are as follows.

16HD: 1,6-hexanediol (manufactured by BASF Ltd.)

14BG: 1,4-butanediol (manufactured by Mitsubishi Chemical Corporation)

ISB: isosorbide (manufactured by Roquette Co., Ltd.)

DPC: diphenyl carbonate (manufactured by Mitsubishi Chemical Corporation)

Mg catalyst: magnesium acetate tetrahydrate (manufactured by FUJIFILM Wako Pure Chemical Corporation)

MDI: diphenylmethane diisocyanate (manufactured by Tokyo Chemical Industry Co., Ltd.)

U-830: dioctyltin monodecanoate (trade name: NEOSTANN U-830, manufactured by NITTOH CHEMICAL Co., Ltd.)

DMF: N,N-dimethylformamide dehydrate (manufactured by FUJIFILM Wako Pure Chemical Corporation)

[Production and Evaluation of Polycarbonate Diol Composition]

Comparative Example I-1

Into a 5 L glass separable flask equipped with a stirrer, a distillate trap, and a pressure adjusting device, 16HD (compound (1)) as a raw material for the structural unit (1), DPC as a carbonate compound, and a Mg catalyst aqueous solution (concentration: 8.4 g/L of magnesium acetate tetrahydrate) as a transesterification reaction catalyst were charged in the blending amounts shown in Table 1, and the atmosphere inside the flask was substituted with nitrogen. Then, the contents in the flask were heated to a temperature of 160 °C while being stirred, and the contents were dissolved by heating. The pressure inside the flask at this time was 101 kPa. Thereafter, the pressure inside the flask was gradually reduced from 101 kPa to 24 kPa over 2 minutes, and then, the reaction was continued for 90 minutes while removing the generated phenol from the reaction system. Next, the pressure inside the flask was gradually reduced to 9.3 kPa over 90 minutes, and then further gradually reduced to 0.7 kPa over 30 minutes. After the reaction was continued, the temperature of the contents was raised to 170 °C, and the reaction was continued for an additional 120 minutes while removing phenol and the unreacted dihydroxy compound from the reaction system. Then, the temperature of the contents was allowed to cool to room temperature to obtain 660 g of polycarbonate diol composition.

The obtained polycarbonate diol composition was designated "PCD1".

The above evaluation was carried out on this PCD1. The evaluation results are shown in Table 1.

Example I-1

The reaction was carried out under the same conditions as in Comparative Example I-1 except that a portion of 16HD (36 g) was heated at 130 °C for 3 hours while bubbling air therethrough, and 16HD, including the portion of 16HD oxidized to 6-hydroxyhexanal, was used as the raw material for the structural unit (1), unlike in Comparative Example I-1.

The obtained polycarbonate diol composition was designated "PCD2".

The above evaluation was carried out on this PCD2. The evaluation results are shown in Table 1.

Example I-2

The reaction was carried out under the same conditions as in Comparative Example I-1 except that a portion of 16HD (99 g) was heated at 130 °C for 3 hours while bubbling air therethrough, and 16HD, including the portion of 16HD oxidized to 6-hydroxyhexanal, was used as the raw material for the structural unit (1), unlike in Comparative Example I-1.

The obtained polycarbonate diol composition was designated "PCD3".

The above evaluation was carried out on this PCD3. The evaluation results are shown in Table 1.

Example I-3

The reaction was carried out under the same conditions as in Comparative Example I-1 except that a portion of 16HD (313 g) was heated at 130 °C for 3 hours while bubbling air therethrough, and 16HD, including the portion of 16HD oxidized to 6-hydroxyhexanal, was used as the raw material for the structural unit (1), unlike in Comparative Example I-1.

The obtained polycarbonate diol composition was designated "PCD4".

The above evaluation was carried out on this PCD4. The evaluation results are shown in Table 1.

Example I-4

The reaction was carried out under the same conditions as in Comparative Example I-1 except that 16HD was heated at 130 °C for 3 hours while bubbling air therethrough, 16HD, including a portion of 16HD oxidized to 6-hydroxyhexanal, and 14BG were used in the blending amounts shown in Table 1 as the raw material for the structural unit (1), and DPC and a Mg catalyst aqueous solution were charged in the blending amounts shown in Table 1, unlike in Comparative Example I-1.

The obtained copolymerized polycarbonate diol composition was designated "PCD5".

The above evaluation was carried out on this PCD5. The evaluation results are shown in Table 1.

Example I-5

The reaction was carried out under the same conditions as in Comparative Example I-1 except that 16HD was heated at 130 °C for 3 hours while bubbling air therethrough, 16HD, including a portion of 16HD oxidized to 6-hydroxyhexanal, was used in the blending amount shown in Table 1 as the raw material for the structural unit (1), ISB was used in the blending amount shown in Table 1 as the raw material for the structural unit (3), and DPC and a Mg catalyst aqueous solution were charged in the blending amounts shown in Table 1, unlike in Comparative Example I-1.

The obtained copolymerized polycarbonate diol composition was designated "PCD6".

The above evaluation was carried out on this PCD6. The evaluation results are shown in Table 1.

In Examples I-1 to I-5 and Comparative Example I-1, by changing the amount of 16HD bubbled with air, the content ratio of 6-hydroxyhexanal (aldehyde (A)) contained in the raw material 16HD used in the production of the polycarbonate diol is changed.

Note that, in Examples I-1 to I-5, examples of the aldehyde (A) contained in the obtained PCD2 to PCD6 include free 6-hydroxyhexanal or 6-hydroxyhexanal bonded to the polycarbonate diol. In addition, in Comparative Example I-1, no compound corresponding to the aldehyde (A) was detected in the obtained PCD1.

Table 1 below also shows the evaluation results of the polyurethane polymerization stability and the viscosity of the polyurethane solution in Examples II-1 to II-3 and Comparative Example II-1 to be described later.

TABLE 1

| | | | Unit | Comparative Example I-1 | Example I-1 | Example I-2 | Example I-3 | Example I-4 | Example I-5 |
|---|---|---|---|---|---|---|---|---|---|
| Blending amount of PCD raw material | Dihydroxy compound composition | 16HD (compound (1)) | g | 569 | 569 | 569 | 569 | 85.0 | 72.8 |
| | | 14BG (compound (1)) | g | 0 | 0 | 0 | 0 | 60.0 | 0 |
| | | ISB | g | 0 | 0 | 0 | 0 | 0 | 90.7 |
| | Carbonate compound | DPC | g | 931 | 931 | 931 | 931 | 272 | 186 |
| | Catalyst | Mg catalyst aqueous solution | mL | 2.5 | 2.5 | 2.5 | 2.5 | 0.7 | 0.6 |
| PCD raw material | Content ratio of aldehyde (A) in dihydroxy compound composition | | ppm by mass | 0 | 100 | 300 | 690 | 510 | 360 |
| PCD evaluation | Kind of PCD composition | | — | PCD1 | PCD2 | PCD3 | PCD4 | PCD5 | PCD6 |
| | Content ratio of aldehyde (A) in PCD composition | | ppm by mass | 0 | 70 | 270 | 420 | 330 | 300 |
| | Content ratio of structural unit (1) in PCD | | mass % | 100 | 100 | 100 | 100 | 100 | 47 |
| | Color tone (APHA) of PCD composition | | — | 10 | 15 | 25 | 80 | 80 | 90 |
| | Number average molecular weight (Mn) of PCD | | — | 2000 | 1848 | 1792 | 1879 | 1935 | 718 |
| | Stability during polyurethane polymerization | | — | Stable | Stable | Stable | Stable | — | — |
| | Viscosity of polyurethane solution | | mPa · s | 82.6 | 89.2 | 90.3 | 93.2 | — | — |

[Production and Evaluation of Polyurethane]

<Purification of Polycarbonate Diol Composition>

In order to remove phenol contained in the polycarbonate diol compositions (PCD1 to PCD4) obtained in Comparative Example I-1 and Examples I-1 to I-3, first, 0.89 g of a 0.85 mass % phosphoric acid aqueous solution was added to 660 g of the polycarbonate diol composition to deactivate magnesium acetate. The solution was then fed to a thin-film distillation device at a flow rate of 20 g/min, and thin-film distillation was carried out (temperature: 180 °C to 190 °C, pressure: 40 Pa to 67 Pa). As the thin-film distillation device, a molecular distillation device, Model MS-300, manufactured by Sibata Scientific Technology Ltd., equipped with an internal condenser having a diameter of 50 mm, a height of 200 mm and an area of 0.0314 $m^2$ and a jacket, was used.

Hereinafter, PCD1 to PCD4 after the thin-film distillation are referred to as PCD1A, PCD2A, PCD3A, and PCD4A, respectively. Table 2 shows the content ratios of the aldehyde (A) and the formyl terminal group in the PCD1A to PCD4A obtained by the thin-film distillation.

Examples of the aldehyde (A) contained in the PCD2A to PCD4A obtained after the thin-film distillation of the PCD2 to PCD4 include free 6-hydroxyhexanal or 6-hydroxyhexanal bonded to the polycarbonate diol. No compound corresponding to the aldehyde (A) was detected in the PCD1A obtained after the thin-film distillation of the PCD1.

Comparative Example II-1

Into a separable flask equipped with a thermocouple and a cooling tube, 69.8 g of PCD1A preheated to 80 °C, 6.30 g of 14BG as a chain extender, 0.02 g of U-830 as a catalyst, and 239 g of DMF as a reaction solvent were charged, and the mixture was immersed in an oil bath set at 55 °C and stirred and mixed at a stirring speed of 60 rpm until the mixture was homogenous.

The amount of water in the reaction solution in the flask was measured, and the amount of MDI consumed by the water was calculated. The amount of each raw material sampled was also recorded, and was corrected accordingly.

To the reaction solution, MDI equivalent to an NCO/OH molar ratio of 0.900 (including water correction) was added as an isocyanate compound in a solid state using a funnel, and the mixture was stirred and mixed at a stirring speed of 60 rpm until it was uniform.

In the present description, the “NCO/OH molar ratio” refers to the ratio (molar ratio) of the total amount of substance (number of moles) of MDI to a value obtained by subtracting the total amount of substance (number of moles) of the contained water from the total amount of substance (number of moles) of the polycarbonate diol and 14BG when MDI is added.

Immediately after the addition of MDI, an exothermic peak was observed, accompanied by a rise in the reaction solution temperature of +10 °C to 15 °C, and 5 minutes after the exothermic peak had subsided, the temperature of the oil bath was set to 70 °C and raised.

One hour after the addition of MDI, the molecular weight of the polyurethane in the reaction solution was measured to confirm whether the target molecular weight (Mw=the range of 170,000 to 180,000) had been reached. In the case where the target was not reached, MDI was added in an amount equivalent to an NCO/OH molar ratio of 0.005 to 0.015, the reaction was continued for an additional 30 minutes or longer, and then the molecular weight of the polyurethane in the reaction solution was measured. The addition of MDI and the molecular weight measurement were repeated until the target Mw was reached. Finally, a polyurethane solution containing a polyurethane having a total NCO/OH molar ratio of 0.990 and a Mw of 170,032 was obtained.

The polymerization stability during polyurethane polymerization and the evaluation results of the polyurethane solution are shown in Table 2.

Examples II-1 to II-3

Polyurethane polymerization was carried out under the same conditions and in the same manner as in Comparative Example II-1 to obtain a polyurethane solution, except that PCD2A, PCD3A, or PCD4A was used instead of PCD1A, and the amounts of each raw material were changed to the amounts shown in Table 2, unlike in Comparative Example II-1.

The polymerization stability during polyurethane polymerization and the evaluation results of the polyurethane solution are shown in Table 2.

In Examples II-1 to II-3, the coefficient of variation of the mechanical properties of the polyurethane is low, the quality of the polyurethane is uniform, and the strength at break, the elongation at break, and the chemical resistance are good. Particularly, the polyurethanes obtained in Examples II-1 and II-2 have mechanical properties and chemical resistance better than those of the polyurethanes obtained in Example II-3 and Comparative Example II-1, and have an excellent balance between the two. On the other hand, in Comparative Example II-1, since the polycarbonate diol composition does not contain an aldehyde (A), the coefficient of variation of the mechanical properties of the polyurethane is high, the quality of the polyurethane is non-uniform, and the strength at break is insufficient.

Although the present invention has been described in detail using specific embodiments, it will be apparent to those skilled in the art that various modifications are possible within the scope of the invention. The present application is based on a Japanese patent application (No. 2023-016724) and a Japanese patent application (No. 2023-016725) filed on Feb. 7, 2023, and a Japanese patent application (No. 2023-136447) and a Japanese patent application (No. 2023-136448) filed on Aug. 24, 2023, the entireties of which are incorporated by reference.

TABLE 2

| | | | Unit | Comparative Example II-1 | Example II-1 | Example II-2 | Example II-3 |
|---|---|---|---|---|---|---|---|
| Blending amount of polyurethane raw material | PCD kind | PCD1A | g | 69.8 | — | — | — |
| | | PCD2A | g | — | 69.8 | — | — |
| | | PCD3A | g | — | — | 69.8 | — |
| | | PCD4A | g | — | — | — | 69.8 |
| | Content ratio of aldehyde (A) in PCD after distillation | | ppm by mass | 0 | 70 | 130 | 380 |
| | Content ratio of formyl terminal group in PCD after distillation | | mol % | 0.000 | 0.064 | 0.104 | 0.319 |
| | Isocyanate compound | MDI | g | 27.5 | 27.6 | 27.9 | 27.5 |
| | Chain extender | 14BG | g | 6.30 | 6.13 | 6.03 | 6.15 |
| | Catalyst | U830 | g | 0.02 | 0.02 | 0.02 | 0.02 |
| | Solvent | DMF | g | 239 | 239 | 238 | 239 |
| Polyurethane evaluation result | Stability during polyurethane polymerization | | — | Stable | Stable | Stable | Stable |
| | Viscosity of polyurethane solution | | mPa · s | 82.6 | 89.2 | 90.3 | 93.2 |
| | Number average molecular weight (Mn) | | — | 71899 | 65586 | 64108 | 58755 |
| | Weight average molecular weight (Mw) | | — | 170032 | 171786 | 172485 | 177456 |
| | Molecular weight distribution (Mw/Mn) | | — | 2.36 | 2.62 | 2.69 | 3.02 |
| | Mechanical properties | 100% Modulus: average | MPa | 6.17 | 6.06 | 6.14 | 5.79 |
| | | 100% Modulus: standard deviation | MPa | 0.075 | 0.058 | 0.054 | 0.024 |
| | | 100% Modulus: coefficient of variation | % | 1.22 | 0.95 | 0.88 | 0.42 |
| | | 300% Modulus: average | MPa | 31.34 | 30.79 | 31.13 | 31.05 |
| | | 300% Modulus: standard deviation | MPa | 0.98 | 0.38 | 0.74 | 0.53 |
| | | 300% Modulus: coefficient of variation | % | 3.14 | 1.24 | 2.38 | 1.71 |
| | | Strength at break: average | MPa | 58.50 | 63.78 | 61.42 | 60.81 |
| | | Strength at break: standard deviation | MPa | 7.20 | 4.94 | 2.85 | 2.57 |
| | | Strength at break: coefficient of variation | % | 12.31 | 7.75 | 4.65 | 4.22 |
| | | Elongation at break: average | % | 495.15 | 545.40 | 521.57 | 488.07 |
| | | Elongation at break: standard deviation | % | 41.56 | 41.82 | 29.45 | 20.89 |
| | | Elongation at break: coefficient of variation | % | 8.39 | 7.67 | 5.65 | 4.28 |
| | Chemical resistance (mass change rate) | Ethanol | mass % | 10.3 | 9.8 | 9.9 | 10.5 |

The invention claimed is:

1. A polycarbonate diol composition, comprising:

a polycarbonate diol; and an aldehyde, wherein the polycarbonate diol comprises a structural unit (1) derived from a compound (1), the compound (1) represented by formula (1), and the aldehyde has from 4 to 8 carbon atoms:

$$HO—(CH_2)_n—OH \quad (1),$$

wherein n is an integer of 4 to 6, wherein the polycarbonate diol composition contains the aldehyde in an amount of from 5 ppm to 440 ppm by mass with respect to a total mass of the composition.

2. The polycarbonate diol composition of claim 1, wherein the aldehyde has an aliphatic hydrocarbon group having 2, or 4 to 7 carbon atoms, while excluding an aliphatic hydrocarbon group having 3 carbon atoms.

3. The polycarbonate diol composition of claim 2, wherein the aldehyde is at least one selected from 6-hydroxyhexanal and adipaldehyde.

4. The polycarbonate diol composition of claim 1, wherein the compound (1) comprises a compound (1-1) of formula (1-1):

$$HO—(CH_2)_6—OH \quad (1-1).$$

5. The polycarbonate diol composition of claim 1, wherein a content ratio of a formyl terminal group in the polycarbonate diol is 0.01 mol % or more with respect to 100 mol % of total terminal groups in the polycarbonate diol.

6. The polycarbonate diol composition of claim 1, wherein the polycarbonate diol has a number average molecular weight (Mn) of from 250 to 5,000.

7. The polycarbonate diol composition of claim 1, wherein the polycarbonate diol further comprises:

at least one selected from a structural unit (2) derived from a compound (2), the compound (2) represented by formula (2); and a structural unit (3) derived from a dihydroxy compound (3), the dihydroxy compound (3) having a moiety represented by formula (3) in a part of a structure:

$$HO—R^1—OH \quad (2),$$

$$—(CH_2—O)— \quad (3),$$

wherein $R^1$ represents a divalent alkylene group having 3 to 20 carbon atoms which may have a substituent, however, the compound (2) does not include the compound (1), and wherein the moiety of formula (3) is not a part of $—CH_2—O—H$.

8. The polycarbonate diol composition of claim 1, wherein the compound (1) comprises a compound derived from a biological raw material.

9. The polycarbonate diol composition of claim 8, wherein the compound (1) is the compound derived from a biological raw material alone, or a mixture comprising the compound derived from a biological raw material and a compound derived from a fossil fuel.

10. The polycarbonate diol composition of claim 8, wherein the compound derived from a biological raw material is a compound derived from a non-edible biomass and/or a non-fossil fuel.

11. A method for producing a polycarbonate diol composition, the method comprising:

polycondensing a carbonate compound and a dihydroxy compound composition comprising a compound (1) of formula (1) and an aldehyde having from 4 to 8 carbon atoms by a transesterification reaction in the presence of a catalyst, to obtain a polycarbonate diol composition comprising a polycarbonate diol:

$$HO—(CH_2)_n—OH \quad (1),$$

wherein n is an integer of 4 to 6, wherein the dihydroxy compound composition comprises the aldehyde in an amount of from 5 ppm to 900 ppm by mass with respect to a total mass of the dihydroxy compound composition.

12. The method of claim 11, wherein the aldehyde has an aliphatic hydrocarbon group having 2, or 4 to 7 carbon atoms, while excluding an aliphatic hydrocarbon group having 3 carbon atoms.

13. The method of claim 12, wherein the aldehyde is at least one selected from 6-hydroxyhexanal and adipaldehyde.

14. The method of claim 11, wherein the compound (1) comprises a compound (1-1) of general formula (1-1):

$$HO—(CH_2)_6—OH \quad (1-1).$$

15. The method of claim 11, wherein the polycarbonate diol composition comprises the aldehyde in an amount of from 5 ppm to 440 ppm by mass or less with respect to a total mass of the composition.

16. The method of claim 11, wherein the polycarbonate diol has a number average molecular weight (Mn) of from 250 to 5,000.

17. The method of claim 11, wherein the dihydroxy compound composition further comprises at least one of a compound (2) of formula (2) and a dihydroxy compound (3) having a moiety of formula (3) in a part of a structure:

$$HO—R^1—OH \quad (2),$$

$$(CH_2—O)— \quad (3),$$

wherein $R^1$ represents a divalent alkylene group having 3 to 20 carbon atoms which may have a substituent, wherein the compound (2) does not include the compound (1), and wherein the moiety of formula (3) is not a part of $—CH_2—O—H$.

18. A polyurethane obtained from the polycarbonate diol composition of claim 1.

19. The polyurethane of claim 18, which is suitable for any one selected from the group consisting of an active energy ray-curable polymer composition, an artificial leather, a synthetic leather, a coating material, a coating agent, an elastic fiber, a pressure-sensitive adhesive, and an adhesive.

* * * * *